US009728006B2

(12) United States Patent
Varga

(10) Patent No.: US 9,728,006 B2
(45) Date of Patent: Aug. 8, 2017

(54) COMPUTER-AIDED SYSTEM FOR 360° HEADS UP DISPLAY OF SAFETY/MISSION CRITICAL DATA

(71) Applicant: REAL TIME COMPANIES, LLC, Phoenix, AZ (US)

(72) Inventor: Kenneth A. Varga, Peoria, AZ (US)

(73) Assignee: REAL TIME COMPANIES, LLC, Phoenix, AZ (US)

( * ) Notice: Subject to any disclaimer, the term of this patent is extended or adjusted under 35 U.S.C. 154(b) by 25 days.

(21) Appl. No.: 13/674,671

(22) Filed: Nov. 12, 2012

(65) Prior Publication Data

US 2013/0162632 A1   Jun. 27, 2013

Related U.S. Application Data

(60) Provisional application No. 61/629,010, filed on Nov. 12, 2011.

(51) Int. Cl.
*G06T 19/00* (2011.01)
*G06F 3/01* (2006.01)
(Continued)

(52) U.S. Cl.
CPC .......... *G06T 19/006* (2013.01); *G02B 27/017* (2013.01); *G06F 3/012* (2013.01);
(Continued)

(58) Field of Classification Search
CPC ..... G06T 19/00; G06T 19/006; G02B 27/017; G02B 2027/0187; G02B 2027/014;
(Continued)

(56) References Cited

U.S. PATENT DOCUMENTS

| 4,024,539 A | 5/1977 | Quilivan |
|---|---|---|
| 5,465,142 A | 11/1995 | Krumes |

(Continued)

OTHER PUBLICATIONS

VRVis Research Center Technical Report TR-VRVis-2002-040, •"ARAS—Augmented Reality Aided Surgery System Descriptio", Splechtna, Rainer C. et al., Vienna, Austria, 2002.

(Continued)

*Primary Examiner* — Xiao Wu
*Assistant Examiner* — Chong Wu
(74) *Attorney, Agent, or Firm* — Polsinelli PC

(57) ABSTRACT

A safety critical, time sensitive data system for projecting safety/mission critical data onto a display pair of Commercial Off The Shelf (COTS) light weight projection glasses or monocular creating an immersive omnidirectional HUD (Heads Up Display) system with 6 degrees of freedom movement with user immersion and user inputs & outputs. The system includes the display, haptic glove, haptic suit, vestibular interface, temperature emulation, smell emulation, and omnidirectional sound, the workstation, the application software, and inputs containing the safety/mission critical information (Current User Position, Total Collision Avoidance System—TCAS, Global Positioning System—GPS, Magnetic Resonance Imaging—MRI Images, CAT scan images. Weather data. Military troop data, real-time space type markings etc.). The workstation software processes the incoming safety/mission critical data and converts it into a three dimensional space for the user to immerse into the environment. Selecting any of the images may display available information about the selected item or may enhance the image, or moving hand or body will generate enhanced environmental perception & awareness, as well as inputs and outputs. Predicted position vectors may be displayed as well as 3D terrain.

12 Claims, 48 Drawing Sheets

(51) Int. Cl.
*G06F 3/0481* (2013.01)
*H04N 13/02* (2006.01)
*G02B 27/01* (2006.01)
*H04N 13/04* (2006.01)

(52) U.S. Cl.
CPC ......... *G06F 3/014* (2013.01); *G06F 3/04815* (2013.01); *H04N 13/0278* (2013.01); *H04N 13/044* (2013.01); *H04N 13/0484* (2013.01); *G02B 2027/014* (2013.01); *G02B 2027/0138* (2013.01); *G02B 2027/0187* (2013.01)

(58) Field of Classification Search
CPC ............. G02B 2027/0138; G06F 3/014; G06F 3/04815; G06F 3/012; H04N 13/0278; H04N 13/044; H04N 13/0484
USPC ............................................... 345/419, 8, 32
See application file for complete search history.

(56) References Cited

U.S. PATENT DOCUMENTS

| | | | |
|---|---|---|---|
| 5,566,073 A | 10/1996 | Margolin | |
| 5,945,985 A * | 8/1999 | Babin | G09B 27/08 715/209 |
| 5,983,161 A | 11/1999 | Lemelson | |
| 6,124,825 A | 9/2000 | Eschenbach | |
| 6,466,185 B2 | 10/2002 | Sullivan | |
| 6,486,799 B1 | 11/2002 | Still | |
| 6,603,491 B2 | 8/2003 | Lemelson et al. | |
| 6,748,325 B1 | 6/2004 | Fujisaki | |
| 6,782,312 B2 | 8/2004 | He | |
| 6,803,912 B1 | 10/2004 | Mark et al. | |
| 6,847,336 B1 | 1/2005 | Lemelson et al. | |
| 7,375,728 B2 | 5/2008 | Donath et al. | |
| 7,426,437 B2 | 9/2008 | Breed et al. | |
| 2001/0003712 A1* | 6/2001 | Roelofs | G06F 3/011 463/37 |
| 2003/0014165 A1 | 1/2003 | Baker et al. | |
| 2003/0020755 A1* | 1/2003 | Lemelson et al. ............ 345/786 | |
| 2003/0122701 A1 | 7/2003 | Tran | |
| 2003/0156046 A1 | 8/2003 | Dwyer et al. | |
| 2003/0210228 A1 | 11/2003 | Ebersole et al. | |
| 2004/0217883 A1 | 11/2004 | Judge et al. | |
| 2004/0239529 A1 | 12/2004 | Tran | |
| 2005/0007261 A1 | 1/2005 | Berson et al. | |
| 2005/0007386 A1 | 1/2005 | Berson et al. | |
| 2005/0049763 A1 | 3/2005 | Walsdorf et al. | |
| 2005/0099433 A1 | 5/2005 | Berson et al. | |
| 2005/0182528 A1 | 8/2005 | Dwyer et al. | |
| 2005/0289472 A1* | 12/2005 | Morita et al. ................ 715/757 | |
| 2006/0066459 A1 | 3/2006 | Burch et al. | |
| 2006/0227012 A1 | 10/2006 | He | |
| 2007/0001874 A1 | 1/2007 | Feyereisen et al. | |
| 2007/0005199 A1 | 1/2007 | He | |
| 2007/0028370 A1* | 2/2007 | Seng | A41D 13/02 2/410 |
| 2007/0067093 A1 | 3/2007 | Pepitone | |
| 2007/0075919 A1* | 4/2007 | Breed | B60R 21/013 345/8 |
| 2007/0086624 A1* | 4/2007 | Breed | G06K 9/00362 382/104 |
| 2007/0100538 A1 | 5/2007 | Wise et al. | |
| 2007/0182589 A1 | 8/2007 | Tran | |
| 2007/0242131 A1 | 10/2007 | Sanz-Pastor et al. | |
| 2008/0015771 A1 | 1/2008 | Breed et al. | |
| 2008/0051947 A1 | 2/2008 | Kemp | |
| 2008/0086240 A1 | 4/2008 | Breed | |
| 2008/0103641 A1 | 5/2008 | Ratcliffe | |
| 2008/0147253 A1 | 6/2008 | Breed | |
| 2008/0157946 A1 | 7/2008 | Eberl et al. | |
| 2009/0018419 A1* | 1/2009 | Torch | 600/318 |
| 2009/0087029 A1* | 4/2009 | Coleman et al. ............. 382/103 | |
| 2009/0189974 A1* | 7/2009 | Deering | G09G 3/02 348/46 |
| 2009/0312817 A1* | 12/2009 | Hogle | A61B 5/0492 607/54 |
| 2010/0045773 A1* | 2/2010 | Ritchey | 348/36 |
| 2011/0035149 A1* | 2/2011 | McAndrew | G05D 1/0038 701/466 |
| 2012/0075168 A1* | 3/2012 | Osterhout et al. ................ 345/8 | |

OTHER PUBLICATIONS

NASA Langley Research Center, •Augmentation of Cognition and Perception Through Advanced Synthetic Vision Technology•, Prinzel et. al., 2005.
Student BMJ, •Augmented Reality in Surgery•, vol. 16, Mar. 2008, pp. 108-109, Thomas, James C.
Information Technology in Biomedicine, IEEE Transactions on, •Distributed Augmented Reality With 3-D Lung Dynamic: A Planning Tool Concept, Jan. 2007, vol. 11, Issue 1, pp. 40-46, Hamza-Lup et. al.
Sal Consultants, •Head Up Display for ATC: A radical solution for air traffic control systems at airports.
Flight International, •Looks Can Kill, Feb. 1993, pp. 33 through 36.
Avionics Magazine, •Night Vision: Beyond Image Intensification, Jan. 1, 2005, Charlotte Adams.
ISMAR 2006, Raytheon Missile Systems, •Performance Analysis of an Outdoor Augmented Reality Tracking System that Relies Upon a Few Mobile Beacon, Azuma et. al.

* cited by examiner

COMPUTER-AIDED SYSTEM FOR 360° HEADS UP DISPLAY OF SAFETY/MISSION CRITICAL DATA

CROSS-REFERENCE TO RELATED APPLICATIONS

This application claims priority from U.S. provisional application Ser. No. 61/628,998, filed Nov. 12, 2011; and from U.S. provisional application Ser. No. 61/629,010, filed Nov. 12, 2011; and is a continuation-in-part of U.S. patent application Ser. No. 12/460,552, filed Jul. 20, 2009.

FIELD

This present disclosure relates generally to a wearable display device. More particularly the disclosure relates to a wearable display device that is operated by moving the user's head and/or eyes, to achieve different views of data corresponding to the direction of the user's gaze. This disclosure discusses specific applications in the aviation field, but further applies to the medical, military, police, fire, leisure, and automotive fields as well as having applications in areas requiring displaying various data onto a 3 dimensional orthogonal space.

BACKGROUND

There are many critical perceptual limitations to humans piloting aircraft or other vehicles as well as doctors and medical technicians implementing procedures on patients, or operators trying to construct or repair or diagnose equipment or structures, or emergency personnel attempting to rescue people or alleviate a dangerous situation. To overcome many of these perceptual limitations immersion as well as augmented reality has been developed to provide necessary and relevant information outside the immediate local perception of the user that is used to optimize the abilities of the user or users well beyond their natural local perception.

With the advent of advanced simulation technology, the augmentation of dynamic three-dimensional surfaces onto a see-through display has become more and more feasible, combined with the ability to track the orientation of an operators head, hand(s), body, and eyes and of objects in a system. Known orientations of mounted see-through displays and data from sensors indicating the states of objects have also been developed. The knowledge base of three-dimensional surfaces can be given the added benefit of augmentation as well as providing the ability to reasonably predict relative probabilities of collisions enabling a user to optimize the user's efforts. Such capabilities allows a user to not only have the visible world augmented, but also in conditions where the visibility is poor due to weather, night, or occlusion by structures can allow the user to have an augmented telepresence as well as a physical presence.

For pilots of aircraft, many of these limitations include occlusion by aircraft structures that keep the pilot from seeing weather conditions, icing on wings and control structures, conditions of aircraft structures, terrain, buildings, or lack of adequate day-light, as well as not knowing the flight plan, position, speed, and direction of other known aircraft, or the position, speed, and direction of unknown aircraft, structures, or flocks of birds received from radar or other sensor data.

SUMMARY

This disclosure relates to displaying safety/mission critical data in real time to the user in a dynamic 3 dimensional orthogonal space to create a virtual omnidirectional/spherical) (360° Heads Up Display (HUD) as well as complete or partial environmental immersion through enhanced/augmented perception. The data inputs and outputs are manipulated and generated by a system (hereinafter referred to as HUD360) and displayed on either a pair of transparent Commercial Off-the-Shelf (COTS) glasses, monocle, a set of opaque COTS glasses and/or monocle, and/or transferred through a haptic glove and/or haptic suit and/or vestibular interface and/or aroma generator. The glasses can be either a projection type or embedded into the display such as a flexible Organic Light Emitting Diode (OLED) display or other technology. The disclosure is not limited to wearable glasses, haptic suit, haptic glove, and/or vestibular interface, where other methods such as fixed HUD devices as well as see-through or perspective positioned sensed oriented imagery capable based hand-held displays can also be utilized if incorporated with remote head and eye tracking technologies as described in U.S. Pat. No. 6,603,491 and U.S. Pat. No. 6,847,336 or by having orientation sensors on the device itself, or by other haptic device external to user.

The pilot (user) can use the HUD360 display to view terrain, structures, and other aircraft nearby and other aircraft that have their flight plan paths in the pilot's vicinity as well as display and highlight this information in directions that are normally occluded by aircraft structures or poor visibility. The system can scan the environment using system sensors and highlight faint or occluded but critical objects. The pilot (user) can also perceive dynamic objects through haptic gloves, haptic suit, as well as motion through a vestibular interface.

Aside from perceiving external information, the health of the aircraft can also be checked by the HUD360 by having a pilot observe an augmented view or have a feeling of an augmented surface of the operation or structure of the aircraft, such as of the aileron control surfaces, and be able to see and feel an augmentation of set, min, or max, control surface position. The actual position or shape can be compared with an augmented perception of proper (designed) position or shape in order to verify safe performance, such as degree of icing, in advance of critical flight phases, where normal operation is critical such as during landing or take off. This allows a pilot or user to be more able to adapt in abnormal circumstances where operating components are not functioning optimally.

Pan, tilt, and zoom cameras & other sensors mounted in specific locations to see & perceive outside of the aircraft can be used to augment the occluded perception of the pilot or user, where said cameras and sensors can follow the direction of the pilots head, hand(s) and/or body, and allow the pilot or user to see the outside of what would normally be blocked by the flight deck and vessel structures, or where said cameras and sensors can move independently of the pilot's or user's perception and body positioning. For instance, an external gimbaled infrared camera can be used for a pilot to verify the de-icing function of aircraft wings to help verify that the control surfaces have been heated enough by verifying a uniform infrared signature and comparing it to expected normal augmented images. A detailed database on the design and structure, as well as full motion of all parts can be used to augment normal operation that a pilot can see, such as minimum maximum position of control structures. These minimum maximum positions can be augmented in the pilots HUD so the pilot can verify control structures' operation whether they are dysfunctional or operating normally.

In another example, external cameras in both visible, infrared, or other spectrum on a space craft can be used to help an astronaut easily and naturally verify the structural integrity of the spacecraft control surfaces, that may have been damaged during launch, or to verify the ability of the rocket boosters to contain plasma thrust forces before and during launching or re-entry to earths atmosphere and to determine if repairs are needed and if an immediate abort is needed.

With the use of both head and eye orientation tracking, objects normally occluded in the direction of a user's gaze (as determined both by head and eye orientation) can be used to display objects hidden from normal view. This sensing of both the head and eye orientation can give the user optimal control of the display augmentation as well as an un-occluded omnidirectional viewing capability freeing the user's hands to do the work necessary to get a job done simultaneously and efficiently.

The user can look in a direction of an object and either by activating a control button of which can be emulated by a haptic glove, or by speech recognition, selects the object. This can cause the object to be highlighted or selected and the system can then provide further information on the selected object. The user can also remove or add layers of occlusions by selecting and requesting a layer to be removed or added. As an example, if a pilot is looking at an aircraft wing, and the pilot wants to look at what is behind the wing, the pilot can select a function to turn off wing occlusion and have corresponding perspective projected image data provided or a live video feed of a gimbaled zoom camera positioned so that the wing does not occlude it. The camera can be oriented to the direction of the pilots head and eye gaze, whereby a live video slice from the gimbaled zoom camera is fed back and projected onto the semi transparent display onto the pilot's perception of the wing surface as viewed through the display by perceptual transformation of the video and the pilots gaze vector. This augments the view behind the wing.

The pilot or first officer or user can also select zoom even further behind the wing surface or other structure, giving beyond the capability of an "eagle eye" view as well as real time remote immersion of the world through augmentation of reality and sensor data from other sources, where the user's eyes can be used to control the gimbaled motion of the zoomable telescopic camera, and the user can feel and manipulate objects through a haptic glove and haptic suit.

As another application to aid the captain or first officer in security detail of the flight deck, the captain or first officer can turn their head looking back into the cabin behind the locked flight deck door and view crew and passengers through a gimbaled zoom camera tied into the captain's or first officer's head/eye orientations to assess security or other emergency issues inside the cabin or even inside the luggage areas. Cameras underneath the aircraft can also be put to use by the captain or first officer to visually inspect the landing gear status, or check for runway debris well in advance of landing or takeoff, by doing a telescopic scan of the runway.

Gimbaled zoom camera perceptions and/or other sensors, as well as augmented data perceptions (such as known dynamic 3D surface data, 3D floor plan, or data from other sensors from other sources) can be transferred between pilot, crew, or other cooperatives with each wearing a gimbaled camera (or having other data to augment) and by trading and transferring perceptual information. For instance, a first on the scene fire-fighter or paramedic can have a zoom-able gimbaled camera and/or infrared and/or other sensors that can be transmitted to other cooperatives such as a fire chief, captain, or emergency coordinator heading to the scene to assist in an operation. The control of the zoom-able gimbaled infrared or other camera can be transferred allowing remote collaborators to have a telepresence (transferred remote perspective immersion and augmentation) to inspect different aspects of a remote perception, allowing them to more optimally assess, cooperate and respond to a situation quickly. Spectral analyzer or equivalent sensor systems can be used to identify chemical composition and smells, and transmit for regeneration elsewhere.

Other systems, methods, features, and advantages of the present disclosure will be or become apparent to one with skill in the art upon examination of the following drawings and detailed description. The features, functions and advantages that have been discussed can be achieved independently in various embodiments of the present invention or may be combined in yet other embodiments further details of which can be seen with reference to the following description and drawings.

BRIEF DESCRIPTION OF THE FIGURES

Many aspects of the present disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1A:
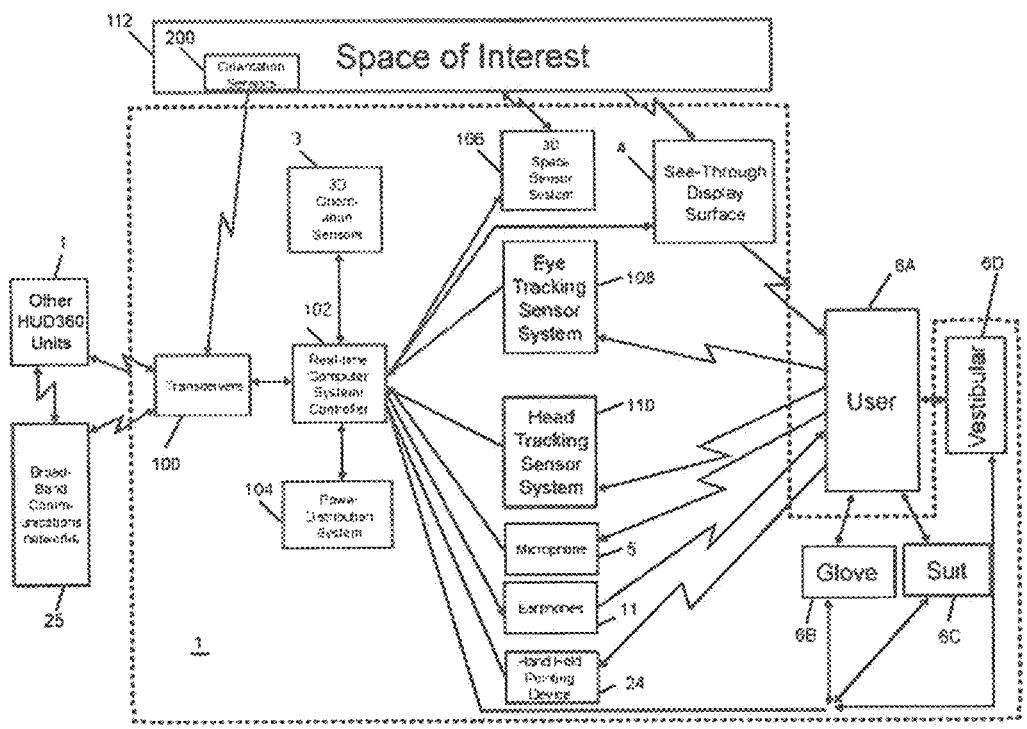
FIG. 1A is a HUD360 system block diagram of a pair of projection type COTS glasses showing a microphone, earphones, and sensors with eye and head tracking, as well as haptic glove, haptic suit, and vestibular interface, in accordance with one embodiment of the present disclosure.
Figure 1B:
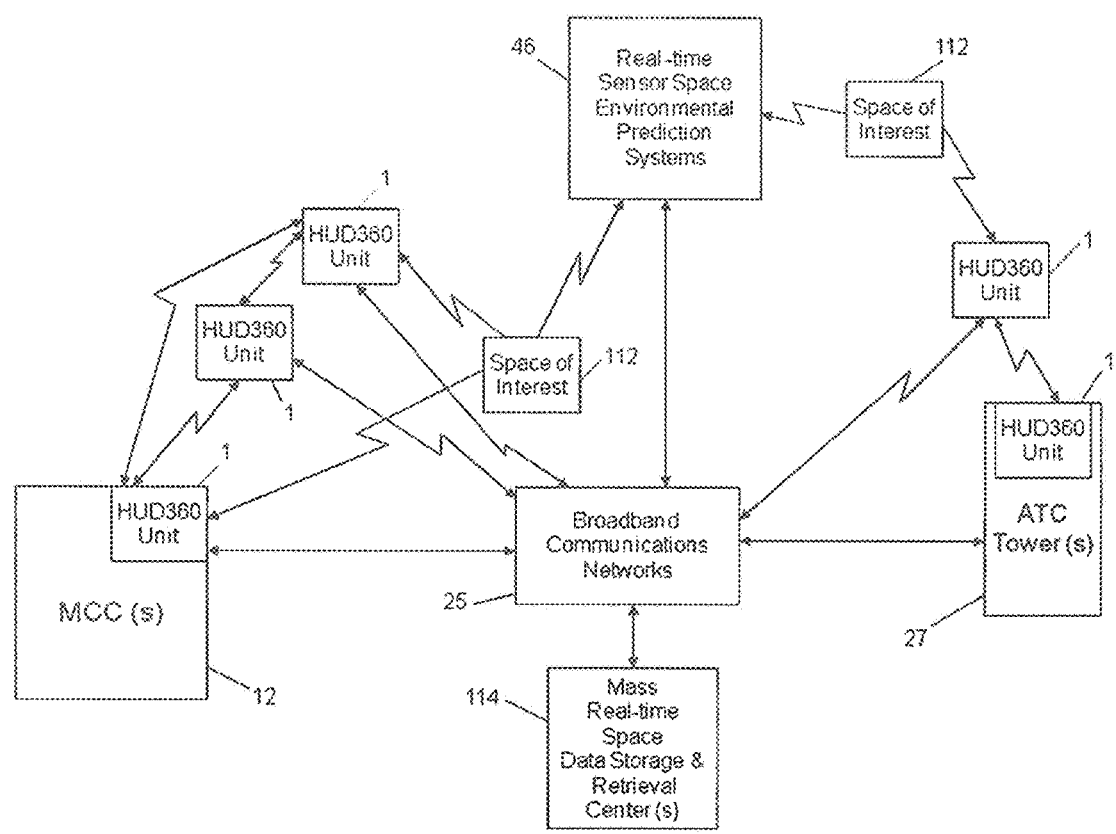
FIG. 1B is a high-level system block diagram of multiple HUD360's, in accordance with another embodiment of the present disclosure.

A functional system block diagram of a HUD360 1 system with see-through display surface 4 viewed by a user 6 of a space of interest 112 is shown in FIG. 1A. In some applications, the HUD360 1 see-through display surface 4 can be set in an opaque mode where the entire display surface 4 has only augmented display data where no external light is allowed to propagate through display surface 4. The HUD360 1 display system is not limited to just a head mounted display or a fixed heads-up-display (HUD), but can be as simple as part of a pair of spectacles or glasses, an integrated hand-held device like a cell phone. Personal Digital Assistant (PDA), or periscope-like device, or a stereoscopic rigid or flexible microscopic probe with a micro-gimbaled head or tip (dual stereo camera system for dept perception), or a flexibly mounted device all with orientation tracking sensors in the device itself for keeping track of the devices orientation and then displaying augmentation accordingly.

Other features of the HUD360 1 system include a head tracking sub-system 110, an eye tracking sub-system 108, and a microphone 5 are all shown in FIG. 1A and all of which can be used as inputs with the ability to simultaneously control the augmented see-through display view 4, or to control another available system of the user's 6A choice. Also shown is a pair of optional earphones 11 which can also be speakers to provide output to user 6A that can complement the augmented output of the see-through display surface 4. Also shown in FIG. 1A is a space sensor system 106 that can be a lone camera of any type or multiple independent cameras of various types that the user 6A or outside user(s) 6A of the system can view and control in real-time. Space sensor system 106 is not limited to a camera or cameras, or an array of cameras, but can be infrared devices, radars, laser scanners, X ray systems, acoustic, or any other suitable sensor system. The camera(s) 106 can be mounted on the goggles as an embedded part of the HUD360 1 system as shown in FIG. 1A, or elsewhere and integrated as appropriate. Sensing and communications between user 6A and see-through display 4 eye tracking sensor system 108, head tracking sensor system 110, microphone 5, earphones 11, and hand-held pointing device 24 are shown as wireless, while to real-time computer system/controller 102 they are shown as wired directly but can be wireless or wired depending on the desired application. All the functional blocks shown within HUD360 1 can be embedded or mounted within the goggles, worn by the user, or can be fixed away from the user 6A depending on the desired application. If the HUD360 1 is used as a non-wearable device, such as a hand-held device, then the head tracking sensor system 110 can contain both head tracking sensors and device orientation sensors where the orientation of the hand-held device as well as orientation of the user's 6A head & eyes is measured and used to control augmentation of display 4.

Real-time computer system/controller 102 is shown in FIG. 1A to primarily augment see-through display 4, route and/or process signals between the user 6A, space sensor system 106, eye-tracking sensor system 108, head tracking sensor system 110, other sensors 111 (not shown), microphone 5, earphones/speakers 11, hand held pointing (or other input such as a wireless keyboard and/or mouse) device 24, haptic glove 6B, haptic suit 6C, vestibular interface 6D, and transceiver 100 to other HUD360 1 units directly, or to other broadband communications networks 25.

Haptic gloves 68 and/or haptic suit 6C can contain means to provide not only a matrix of tactile feel of varying magnitudes, but also a matrix of temperature and humidity sensation (hot, warm, cool, cold, moist, wet, etc.) variance such as via cooling or heating micro-tubes using liquid or gas flow.

Other capabilities of haptic glove 68 and/or haptic suit 6C can include pinching matrices via actuators or other means, as well as vibration matrices of varying magnitudes. Further, matrix moisture controls and even safe low level micro electric matrix shock (emulating static discharge or other sensation) can be incorporated in haptic glove 68 and haptic suit 6C. Aroma generating system 6H (not shown, but can connect between user 6A and real-time computer system/controller 102) can also be incorporated to generate smells to further enhance the immersion experience.

Transceiver(s) 100 in FIG. 1A receives data from orientation sensors 200 inside space of interest 112. Optional relative orientation sensors 200 inside space of interest 112 provides orientation data along with the head tracking sensor system 110 (may include hand-held device orientation sensor if non-wearable HUD360 1 is used) along with eye tracking sensor system 108 to align and control augmentation on display 4. The optional orientation sensors 200 on or in the space of interest are used for the application of manufacturing or repair of a controlled structure to provide a frame of reference to use with the augmentation on the display surface 4.

Power distribution system 104 can be controlled by real-time computer system/controller 102 to optimize portable power utilization, where the power is distributed to all the functional blocks of the HUD360 1 unit that are mobile needing power and turned on, off, or low power state as needed to minimize power losses. Transceiver 100 can also serve as a repeater, router, or bridge to efficiently route broadband signals from other HUD360 1 devices as a contributing part of a distributed broadband communications network 25 shown in FIG. 18. Transceiver 100 can be made to send and receive data such as Automatic Dependent Surveillance-Broadcast (ADS-B) data, but transceiver 100 is not limited to ADS-B, or to radio technology and can include other forms of transmission media such as from optical laser technology that carries traffic data or other collected data from other HUD360 1 units directly, indirectly, or receive data from mass real-time space data storage & retrieval centers 114 shown in FIG. 18.

Figure 18:
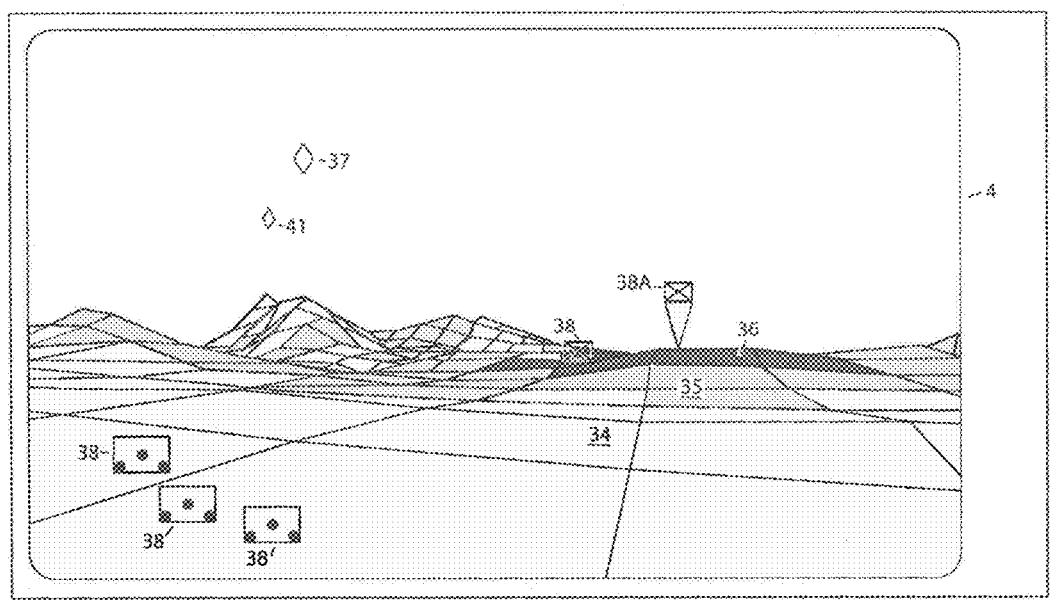
FIG. 18 is an illustration of a military battlefield view, showing an Augmented Ground view, in accordance with another embodiment of the present disclosure.

FIG. 18 is a high-level system view of multiple HUD360's 1 cooperating together independently, or as part of an Air Traffic Control (ATC) Tower 27, or Military Control Center (MCC) 12 or other control center, not shown. The HUD360 1 units are shown to utilize direct path communications between each other if within range, or by using broadband communications networks 25 that can include terrestrial (ground networks) or extra-terrestrial (satellite) communication systems. The HUD360 1 unit can share information about spaces of interest 112 by communicating directly with each other, or through broadband communications networks 25. In addition, the HUD360 1 units can read and write to real-time space data storage & retrieval centers 114 via the broadband communications networks 25. Predicted data can also be provided by real-time sensor space environmental prediction systems 46 such as from radars or satellite. All systems and data can be synchronized and standardized to common or multiple atomic clocks, not shown, and weighted accordingly by time reliability and probabilities, to improve accuracy and precision of real-time data.

Figure 2A:
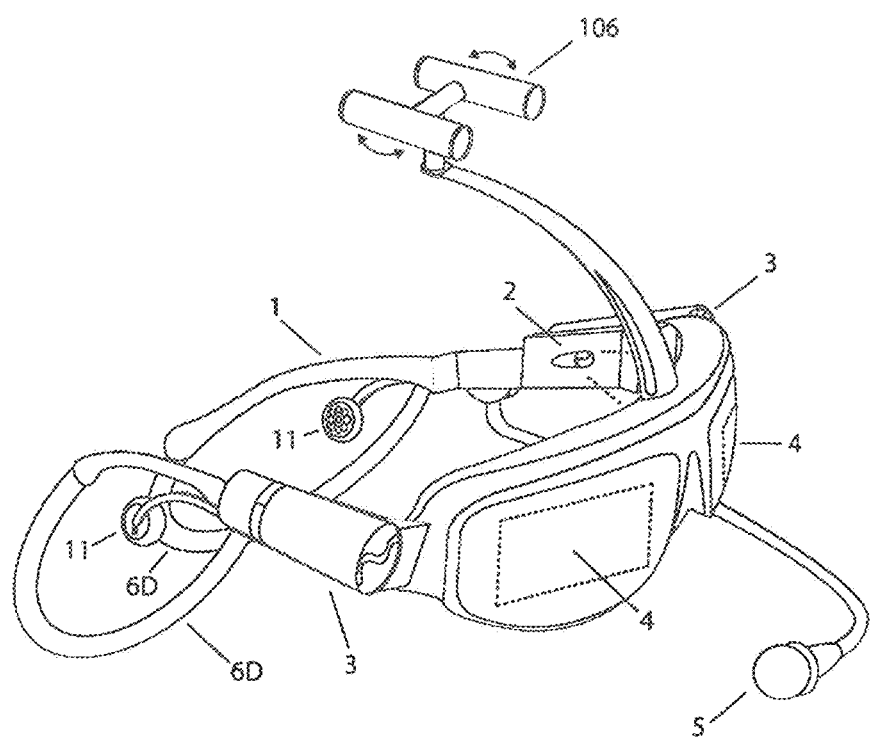
FIG. 2A is a diagram of a pair of projection type COTS glasses with optional microphone, earphones, vestibular interface, and gimbaled zoom camera or other sensor system shown, in accordance with another embodiment of the present disclosure.

Shown in FIG. 2A is an example of a lightweight COTS HUD360 1 see-through goggles with full peripheral capable display projection source that can also contain optional eye-tracking sensors 2, head orientation sensors 3, see-through display surfaces in the user's view 4, optional microphone 5, optional omnidirectional 3D high precision sound generating earphones 11, optional vestibular interface 6D, and optional space sensor system 106 (shown as gimbaled zoom able stereo camera system). The display surface 4 is primarily used to augment the optical signals from the environment (space of interest 112 not shown) outside with pertinent data useful to the user of the display. This augmented data can be anything from real-time information from sensors (such as radars, cameras, real-time database data, satellite, etc.), or can implement applications used on a typical desk top computer laptop, cell phone, or hand held device such as a Personal Digital Assistant (PDA) where internet web browsing, text messages, e-mail, can be read from a display or through text to speech conversion to earphones 11 or written either by manually entering using an input device such as the eyes to select letters, or by an external input device such as a virtual keyboard or mouse wirelessly integrated with HUD360 1, or by speech to text conversion by user speaking into microphone 5 to control applications.

Figure 2B:
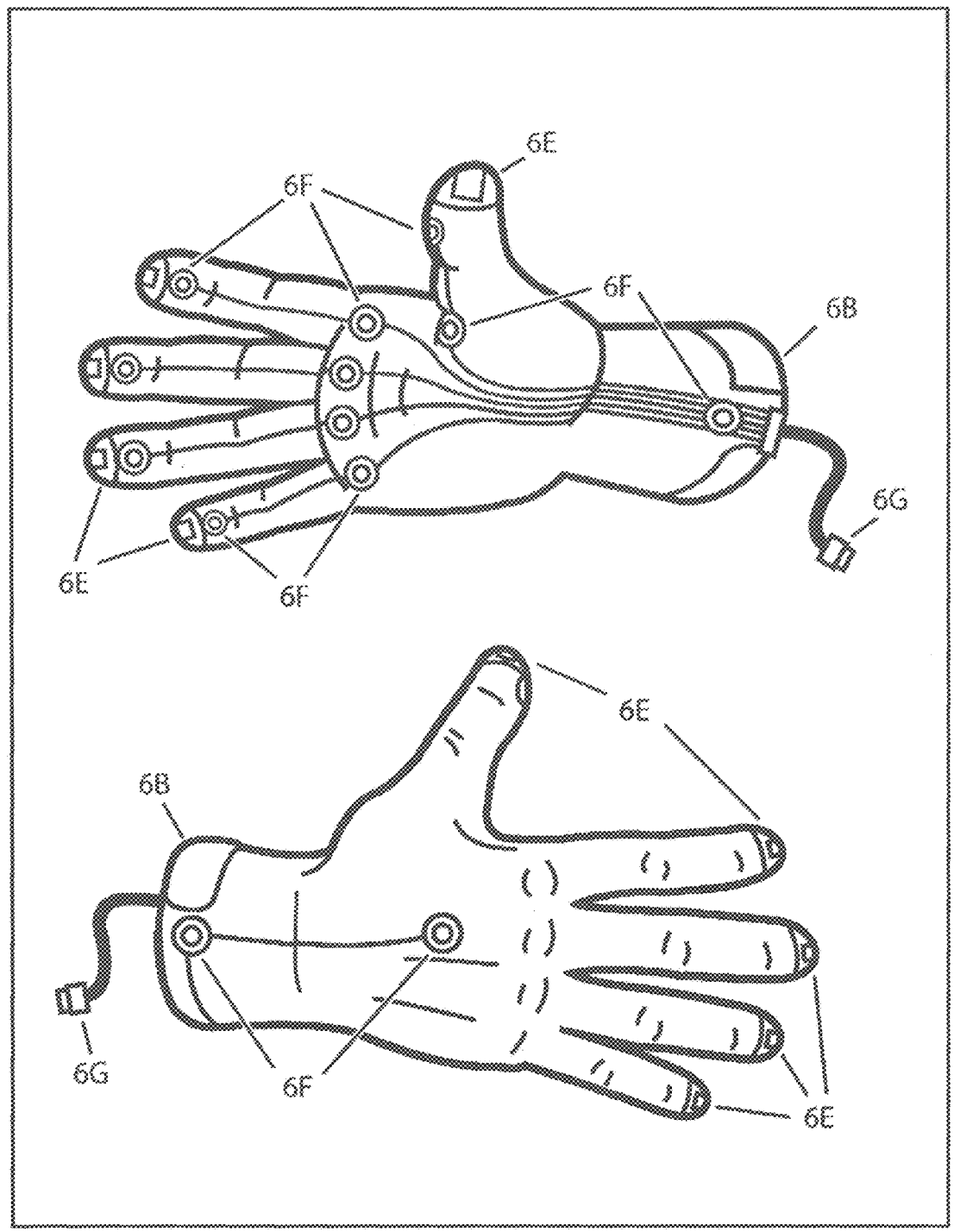
FIG. 2B is an example of a haptic glove with position sensors, and actuators, in accordance with another embodiment of the present disclosure.

FIG. 2B shows example haptic gloves 68, with actuators/vibrators 6E, as well as position sensors 6F. Real time 3D environmental data can be used to activate actuators/vibrators 6F based on position sensors 6F data. Gloves 68 can be further enhanced to include a cooling and heating as well as humidity experience of varying magnitudes using a matrix of micro-tubing or other means, as well as actuators or other means for pinching and/or poking.

Figure 2C:
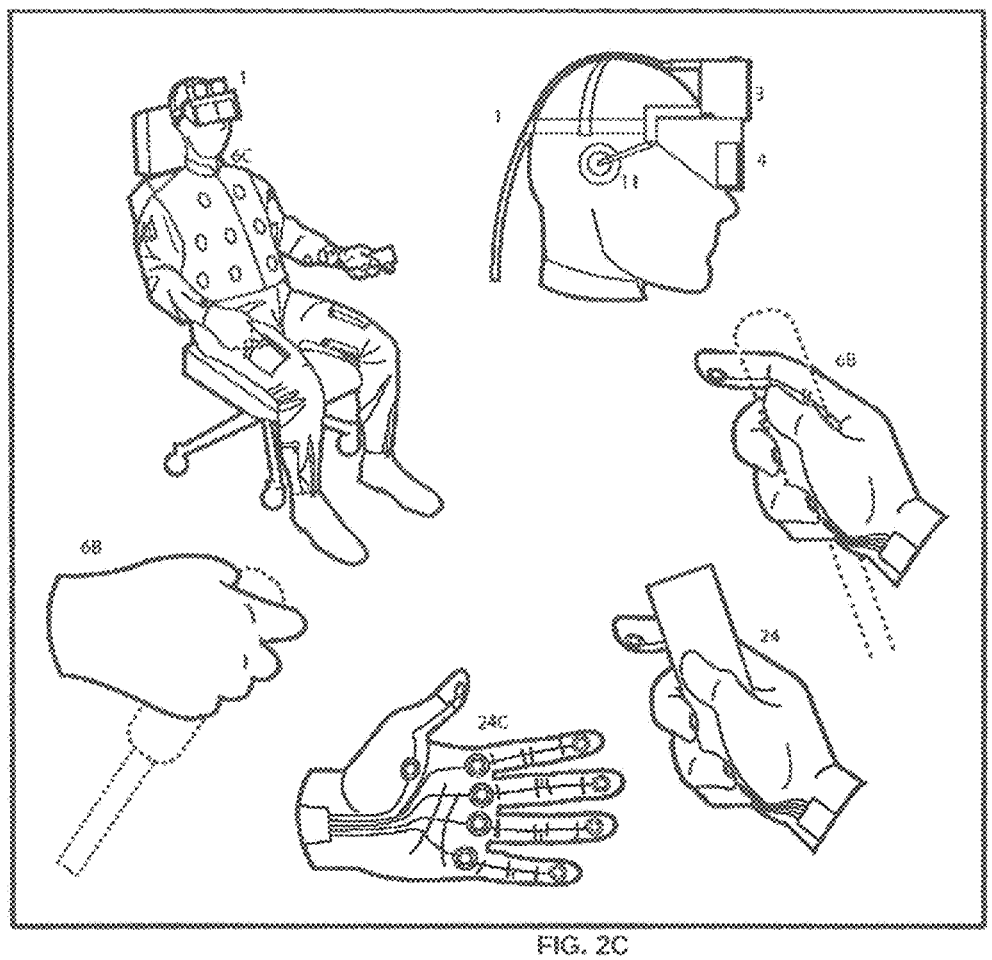
FIG. 2C is an illustration of a user with a haptic suit, glove, & goggles, showing an emulated control stick as well as a real hand held control device, in accordance with another embodiment of the present disclosure.

FIG. 2C shows a HUD360 1 on a user's head sitting in a chair wearing a haptic suit 60, as well as haptic glove 68 where a user can either use a hand held pointing device 24 or pointing sensors 240 on haptic glove 68 where a control surface such as a control stick is emulated using vibration and position sensors on haptic glove 68. Also shown is a user wearing a HUD360 1 with 3D orientation sensors 3 display surface 4 with speaker/earphones 11. Haptic full body suit 60 (that can include boots or shoes/socks) can be further enhanced to include a cooling and heating as well as humidity experience of varying magnitudes using a matrix of micro-tubing or other means, as well as actuators or other means for pinching and/or poking.

Figure 2D:
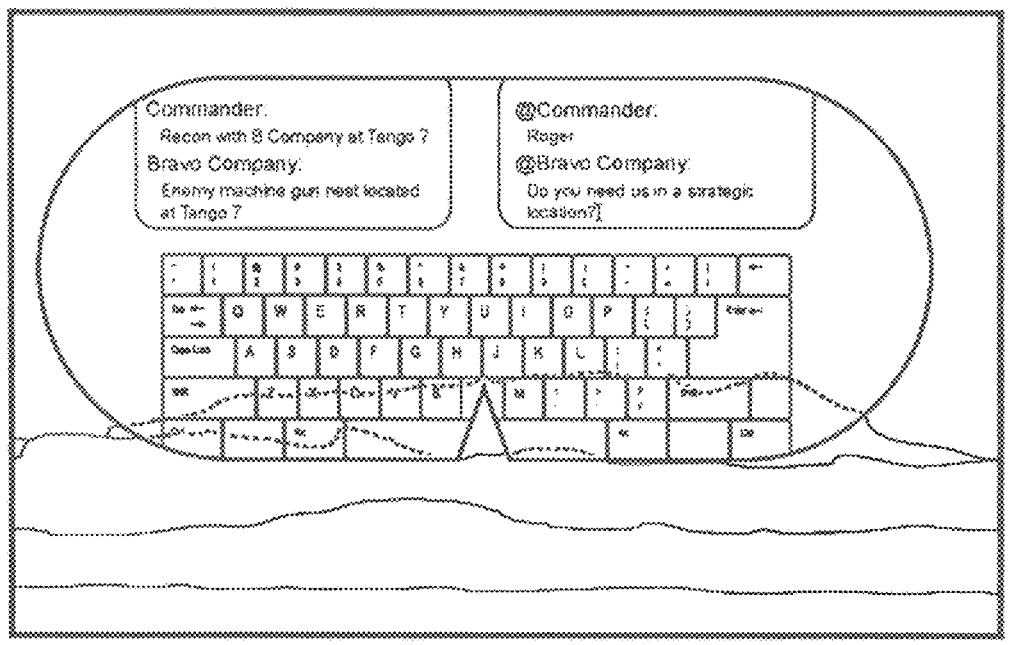
FIG. 2D is an example of a virtual keyboard display that a haptic glove can be used to feel, see, and press, and activate emulated virtual keys, in accordance with another embodiment of the present disclosure.

FIG. 2D is an example of a virtual keyboard display that a haptic glove can be used to feel, see, and press, and activate emulated keys.

Figure 2E:
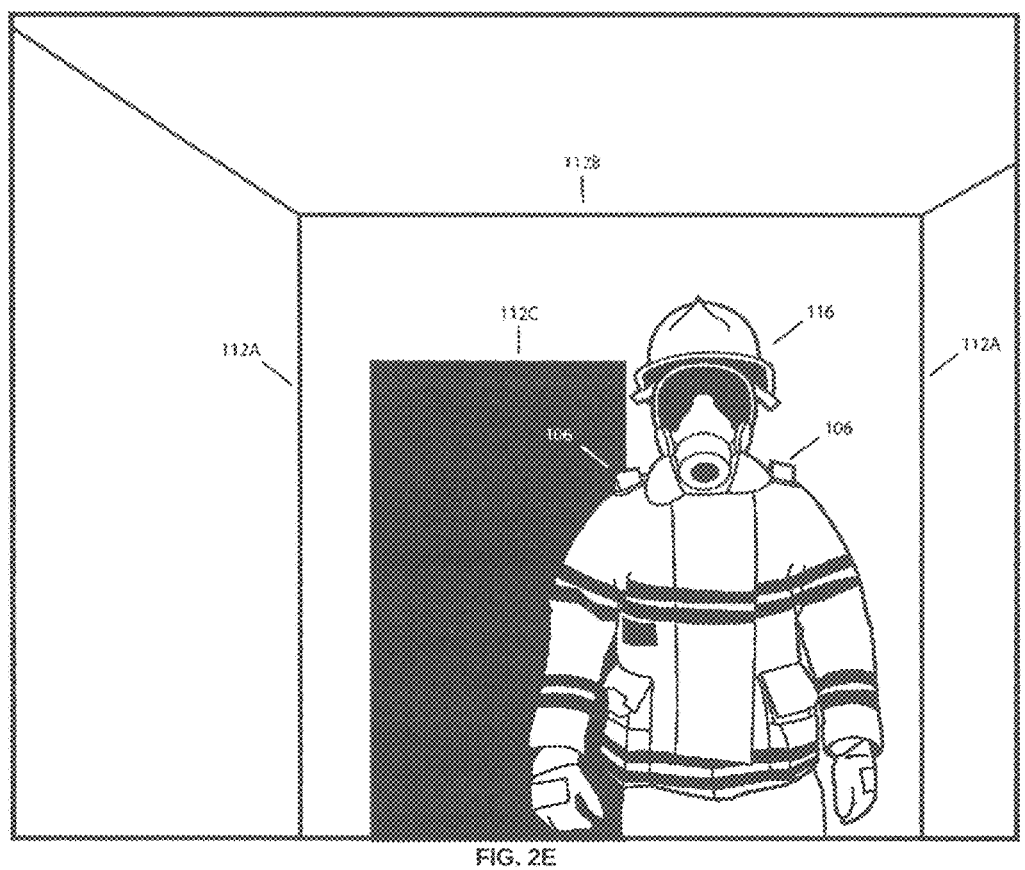
FIG. 2E is an example of a firefighter inside an environment being mapped using a HUD360 system, in accordance with another embodiment of the present disclosure.

FIG. 2E is an example of a firefighter inside an environment being rapidly mapped in real time using a HUD360 where a fireman is shown with a wireless beacon activated 116, with space sensor system 106 shown on shoulders of fireman, that provides environmental space data where walls 112A ceiling 112B and door 112C are shown.

Figure 2F:
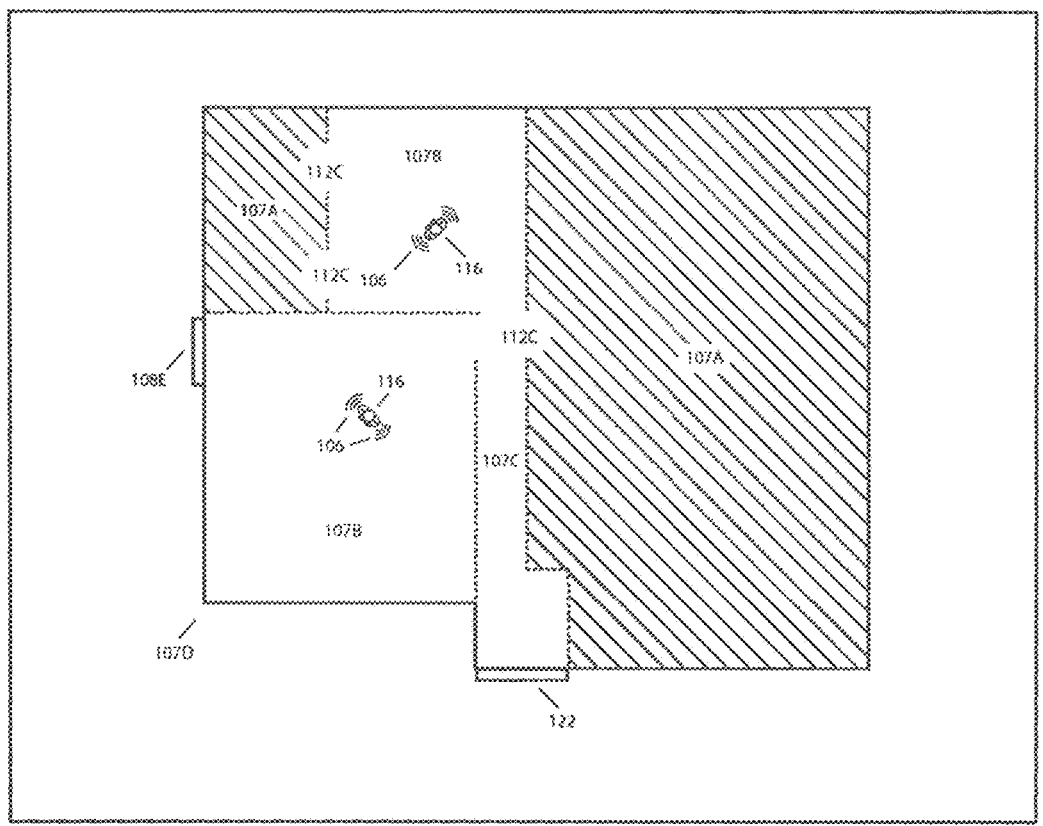
FIG. 2F is an illustration of a fire chiefs view looking down at firefighters and their positions, in accordance with another embodiment of the present disclosure.

FIG. 2F is an illustration of a fire chiefs view looking down at firefighters and their positions on a specific floor level plan view regions 107 where two firefighters 116 in distress are shown with their emergency locating beacons activated with floor plan area exit 122 and adjacent exit ways 112C identified. Hazard zones 107A and known regions 107B as well as safest identified rescue path 107C is identified.

Figure 2G:
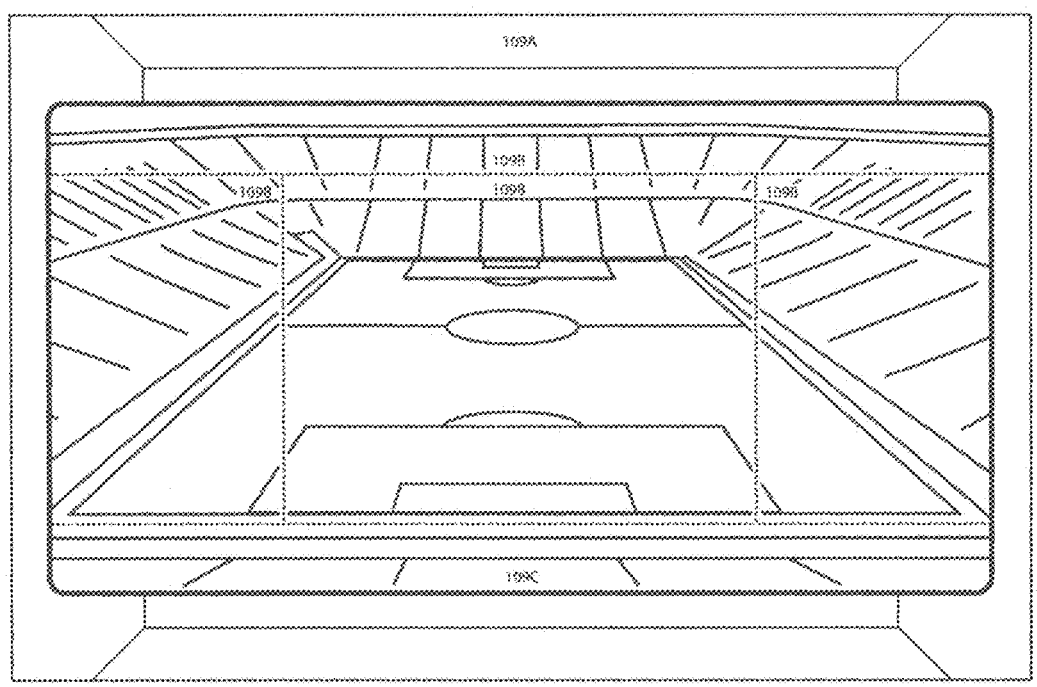
FIG. 2G is an example application of a space sensor system as a multi-camera rig in a sports stadium, in accordance with another embodiment of the present disclosure.
Figure 2H:
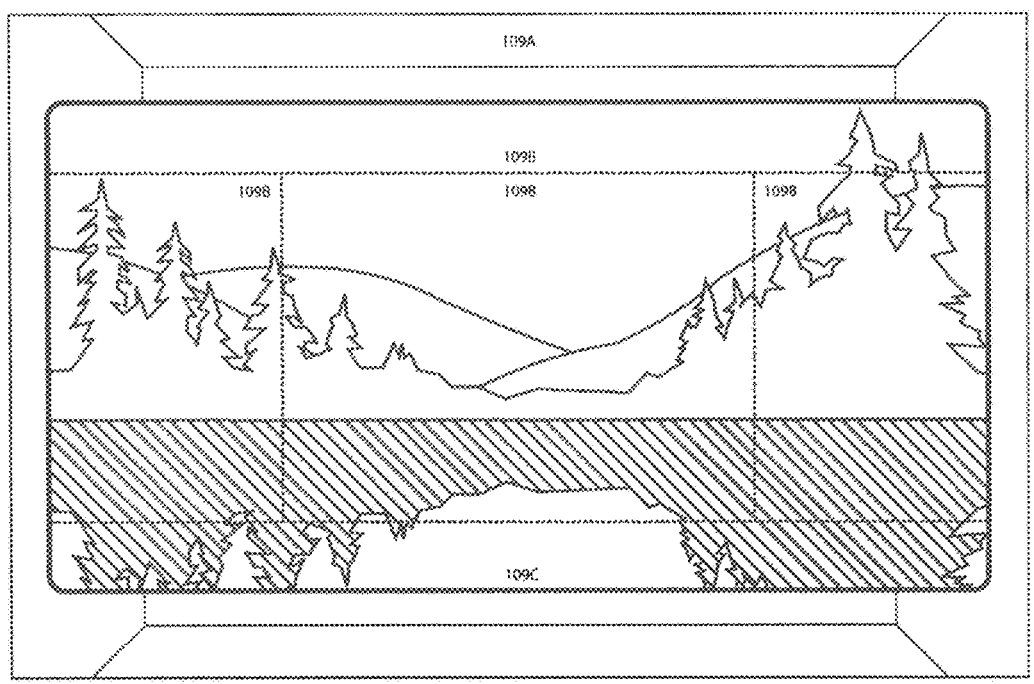
FIG. 2H is an example application of a space sensor system as a multi-camera rig in a national park, in accordance with another embodiment of the present disclosure.

FIG. 2G and FIG. 2H are example applications of a space immersion system as a multi-camera rig in a sports stadium and national park respectively, whereby effectively immerging user into stadium & park space as if being in a holographic deck where orientation is displayed on top 109A, wall 109B, and floor 109C displays.

An augmented perception of a pilot view with a HUD360 1 is shown in FIGS. 3A, 3B, 3C, 4A, 4B, 5, 13 and FIG. 21.

Figure 3A:
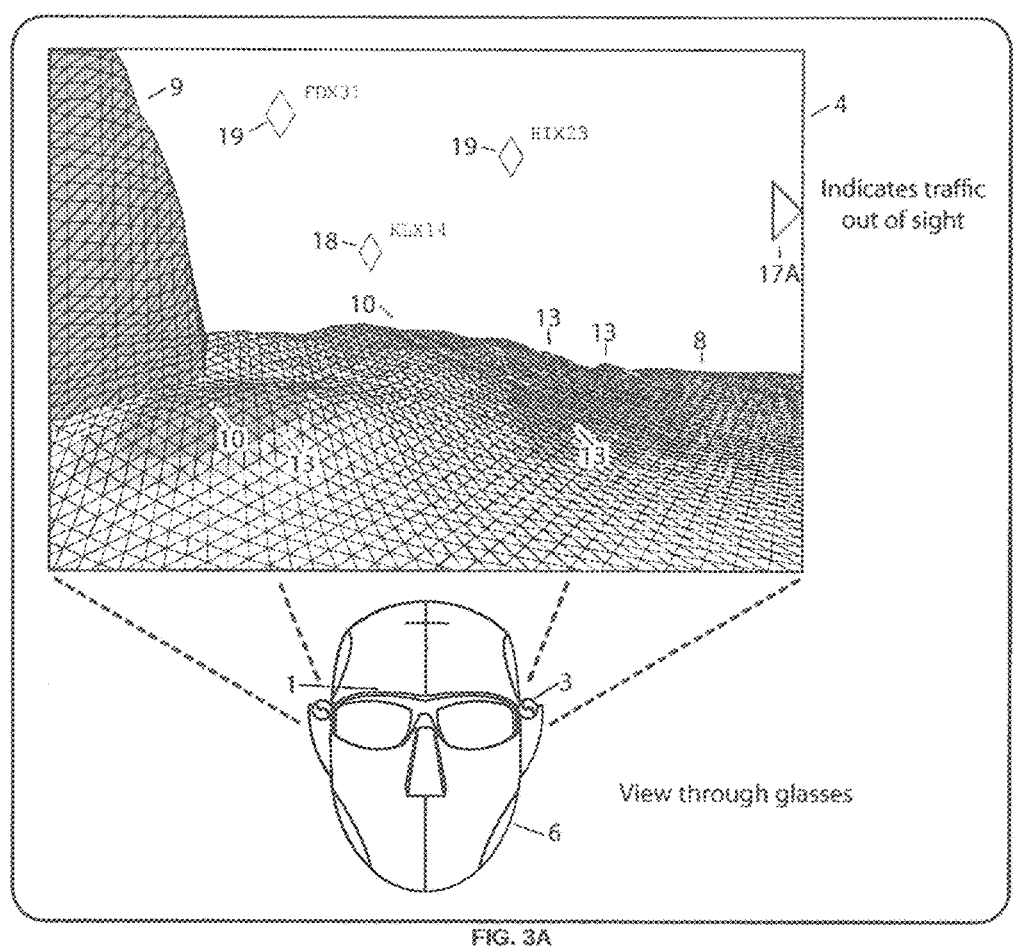
FIG. 3A is an augmented pilot view with aircraft flight plan view with critical and caution terrain shown, along with a "Traffic out of sight" indicator, in accordance with another embodiment of the present disclosure.

FIG. 3A shows the augmented perception of a pilot view using a HUD360 1 where safe terrain surface 8, cautionary terrain surface 13, and critical terrain surfaces 9 and 10 are identified and highlighted. Aircraft positions are also augmented on the HUD360 1 display as an aircraft 18 on a possible collision course with critical terrain surface 9 as a mountain on the left of the see through display view 4 (can be displayed in red color to differentiate, not shown in the FIG.). Also shown is aircraft 19 not on a possible collision course (can be displayed in another color not shown in the FIG., such as green, to differentiate from possible collision course aircraft 18). Aircraft out of sight 17A is augmented on the see-through display views 4 that is shown in the direction relative to the pilot's direction of orientation, are indicated in their direction on the see-through display edge and can be colored accordingly to indicate if it is an out-of-sight collision course (not shown) or non-collision course aircraft 17A. Other out of sight indicators not shown in the figure can be displayed and are not limited to aircraft such as an out-of-sight indicator for an obstruction or mountain, etc, and the seriousness of the obstruction can be appropriately indicated such as by color or flashing, etc. Aircraft out of sight and on a collision course can also be indicated in their direction to see on the display edge though not shown in the figures. Critical surface 10 can be colored red or some other highlight so that it is clear to the pilot that the surface is dangerous. Cautionary surface 13 can be colored yellow or some other highlight so that it is clear to the pilot that the surface can become a critical surface 10 if the aircraft gets closer or if the velocity of the aircraft changes such that the surface is dangerous. Safe terrain surface 8 can be colored green or some other highlight so that it is clear to the pilot that the surface is not significantly dangerous. Other highlights or colors not shown in the figures can be used to identify different types of surfaces such as viable emergency landing surfaces can also be displayed or colored to guide the pilot safely down.

Figure 3B:
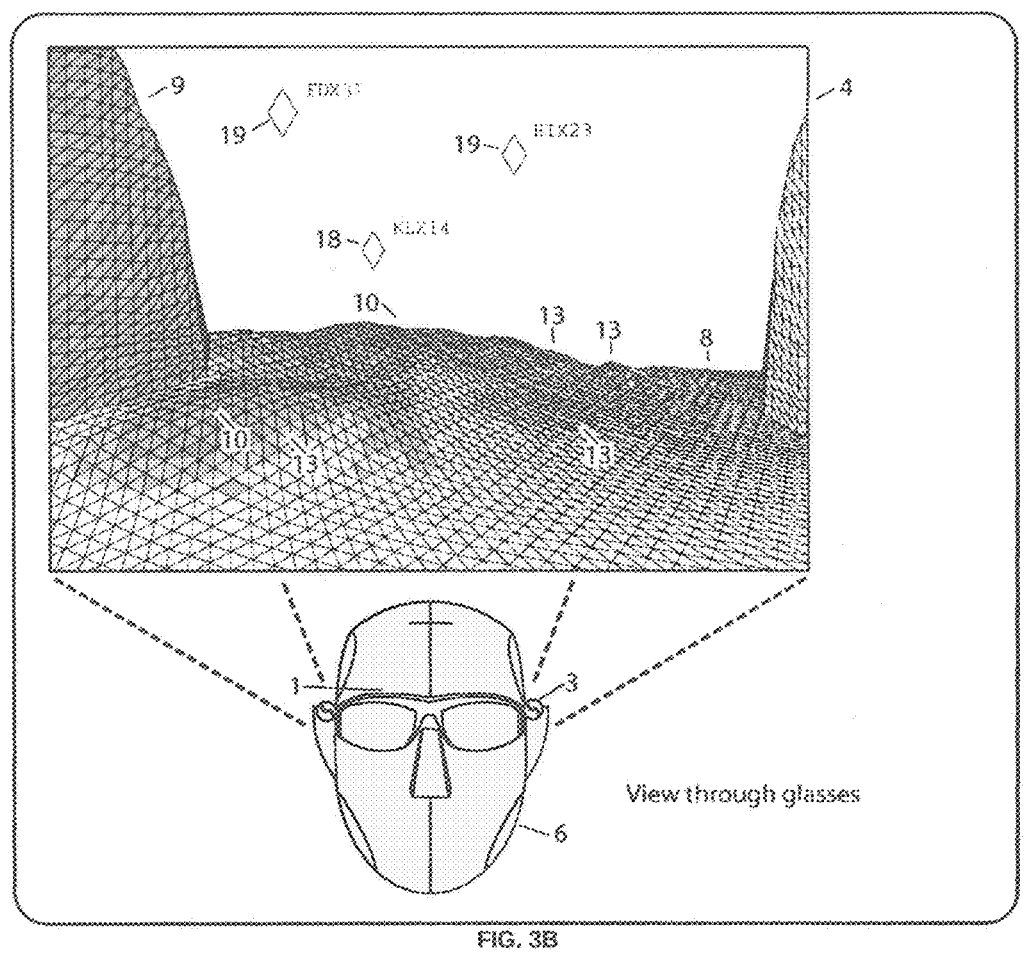
FIG. 3B is an augmented pilot view with aircraft flight plan view with critical and caution terrain shown, in accordance with another embodiment of the present disclosure.

Aircraft direction, position, and velocity are also used to help determine if a landscape such as a mountain or a hill is safe and as shown in FIG. 3B unsafe terrain is highlighted as a critical surface 9 (can be colored red) or as a safe terrain surface 8 (can be colored green). These surfaces can be highlighted and/or colored in the see-through display view 4 so that it is clear to the pilot which surface needs to be avoided and which surface is not significantly dangerous to immediately fly towards if needed.

Figure 3C:
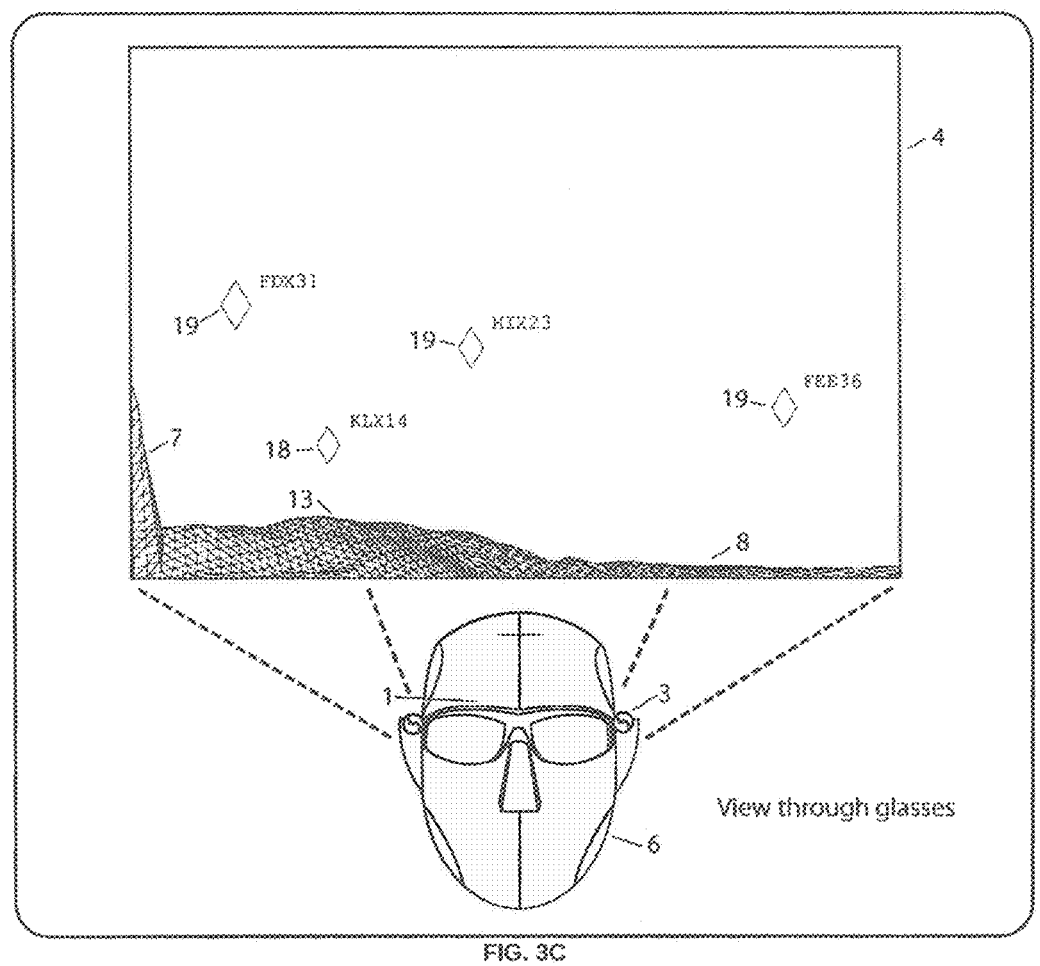
FIG. 3C is an augmented pilot view with aircraft flight plan view with caution terrain shown, in accordance with another embodiment of the present disclosure.

FIG. 3C shows another view through the HUD360 1 with no critical surfaces highlighted, but a cautionary surface 13, and safe terrain surface 8 along with aircraft not on collision course 19 as well as an aircraft 18 on a possible collision course. Not shown in the figures, a critical terrain (9 or 10) out of view indicator can also be displayed on the edge of the see-through display in the direction of the critical terrain out of view.

Figure 4A:
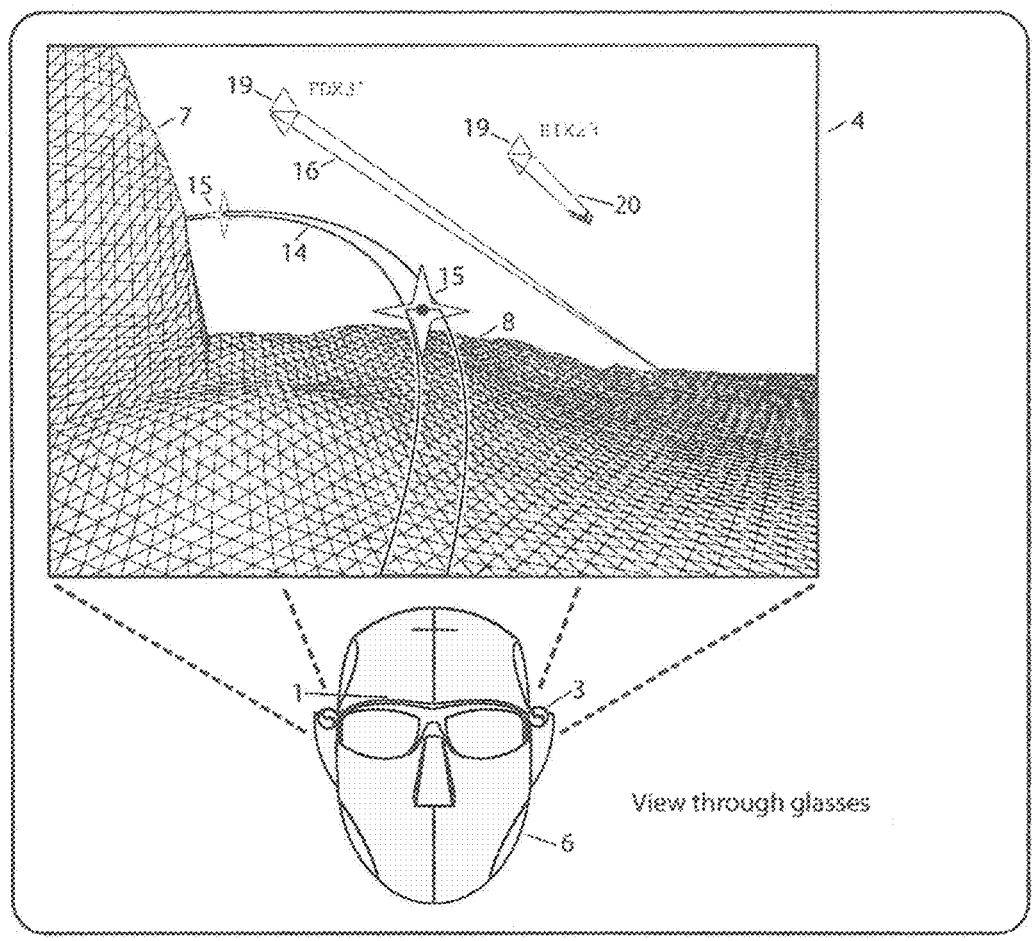
FIG. 4A is an augmented pilot view with aircraft flight plan ribbon displayed with non-critical terrain, in accordance with another embodiment of the present disclosure.

Shown in FIG. 4A is another view of the HUD360 1 with no critical surfaces highlighted, shows the pilot's aircraft flight plan path 14 with two way points identified 15, with aircraft 19 that has a known flight plan 16 displayed along with another aircraft 19 with only a predicted position vector 20 known. The predicted position vector 20 is the predicted position the pilot must respond to, in order to correct the course in time, and is computed by the velocity and direction of the vessel.

Figure 4B:
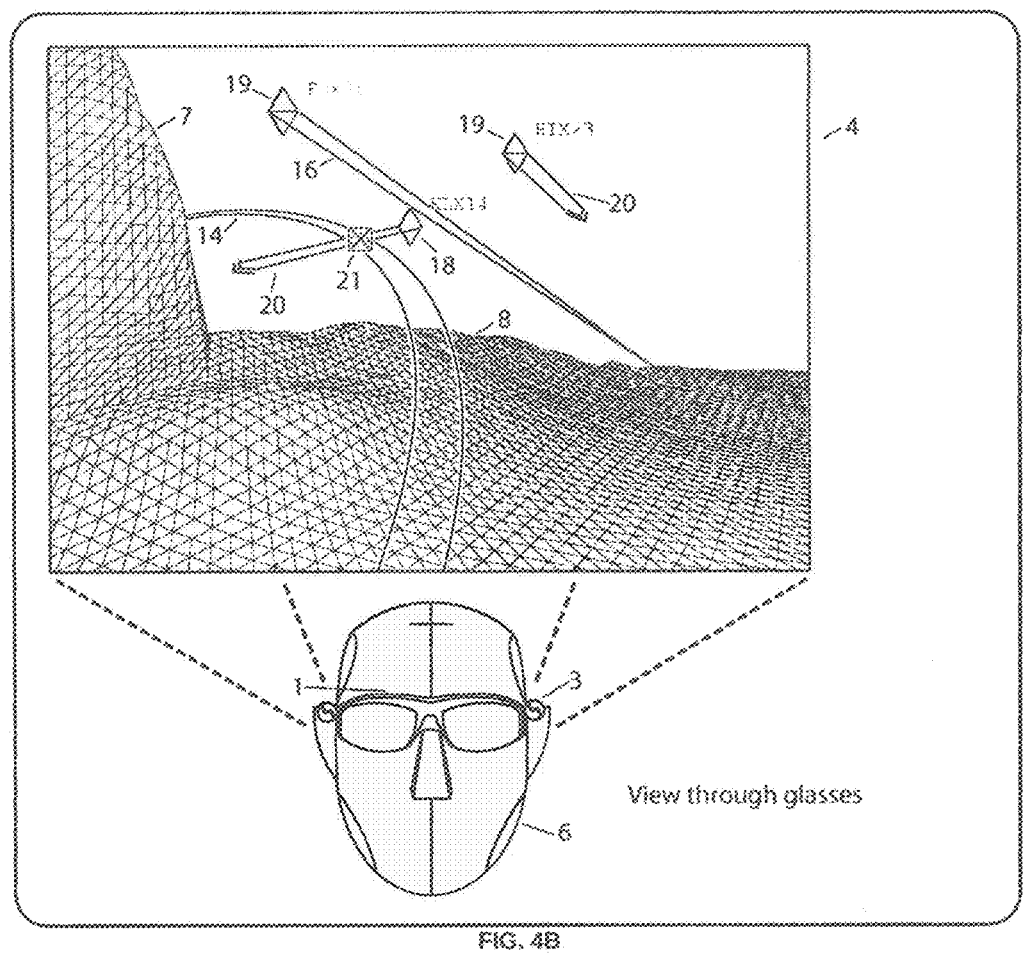
FIG. 4B is an augmented pilot view with aircraft flight plan ribbon displayed with a collision course warning with another aircraft above non-critical terrain, in accordance with another embodiment of the present disclosure.

A possible collision point 21 is shown in FIG. 4B in see through display view 4 where the HUD360 1 shows the pilot's aircraft flight plan path 14 intersecting at predicted collision point 21 with aircraft 18 with known predicted position vector 20 all over safe terrain surfaces 8 and 7.

Figure 5:
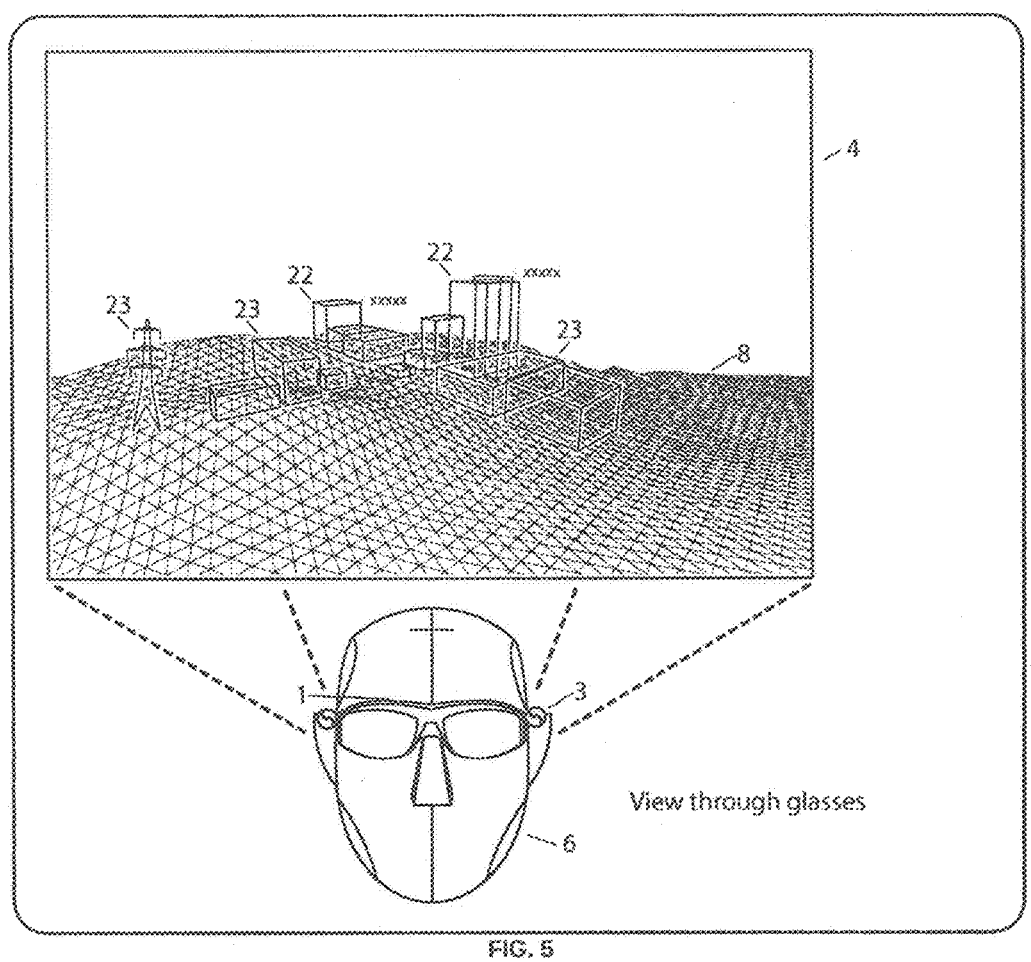
FIG. 5 is an augmented pilot view of both terrain and of ground structures, where structures that are dangerous to the flight plan path are highlighted in the display, in accordance with another embodiment of the present disclosure.

Critical ground structures 22 are highlighted in the HUD360 1 pilot view 4 in FIG. 5 where non-critical structures 23 are also shown in the see-through display view 4 on HUD360 1 on top of non-critical terrain surface 8.

FIGS. 6, 7, 8, 9, 10, 11 and 12 show another example of the disclosure as an augmented perspective of an air traffic controller inside an Air Traffic Control (ATC) tower.

Figure 6:
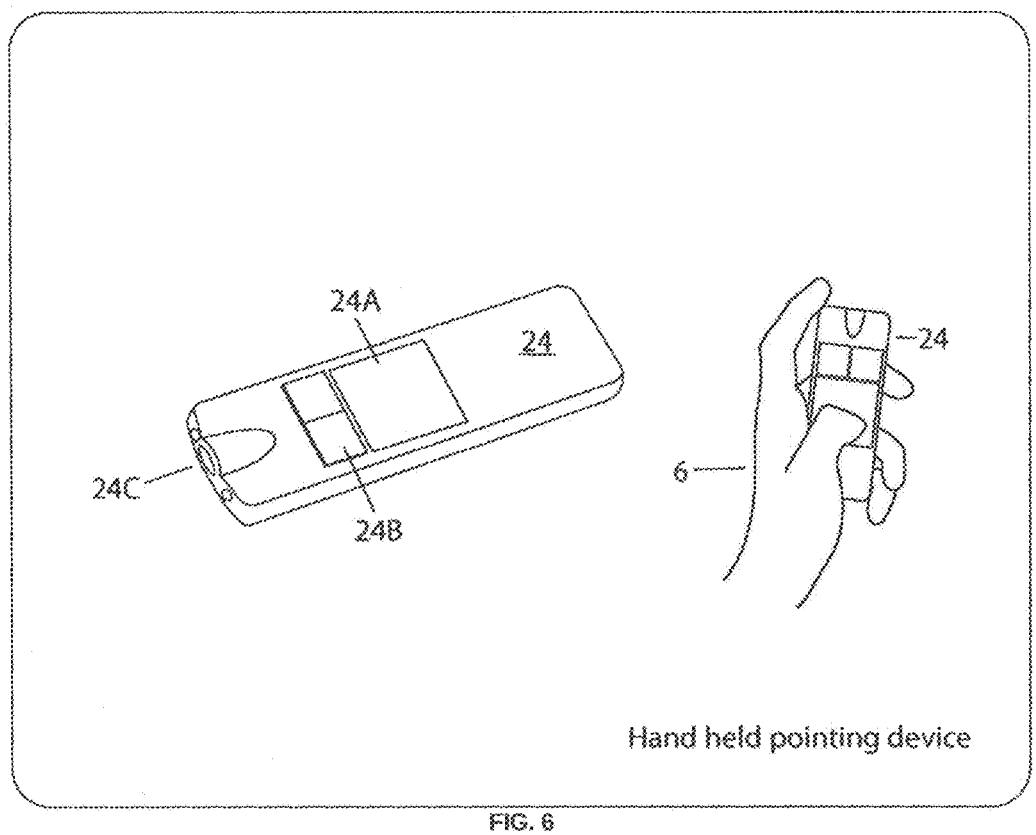
FIG. 6 is an illustration of a hand-held pointing device that is used for controlling a display, in accordance with another embodiment of the present disclosure.

A pointing device 24 in FIG. 6 is used by user 6 to control a Heads-Up Display (HUD) with thumb position sensor 24A, mouse buttons 248, and pointing sensor 240 that can also serve as a laser pointer.

Figure 7:
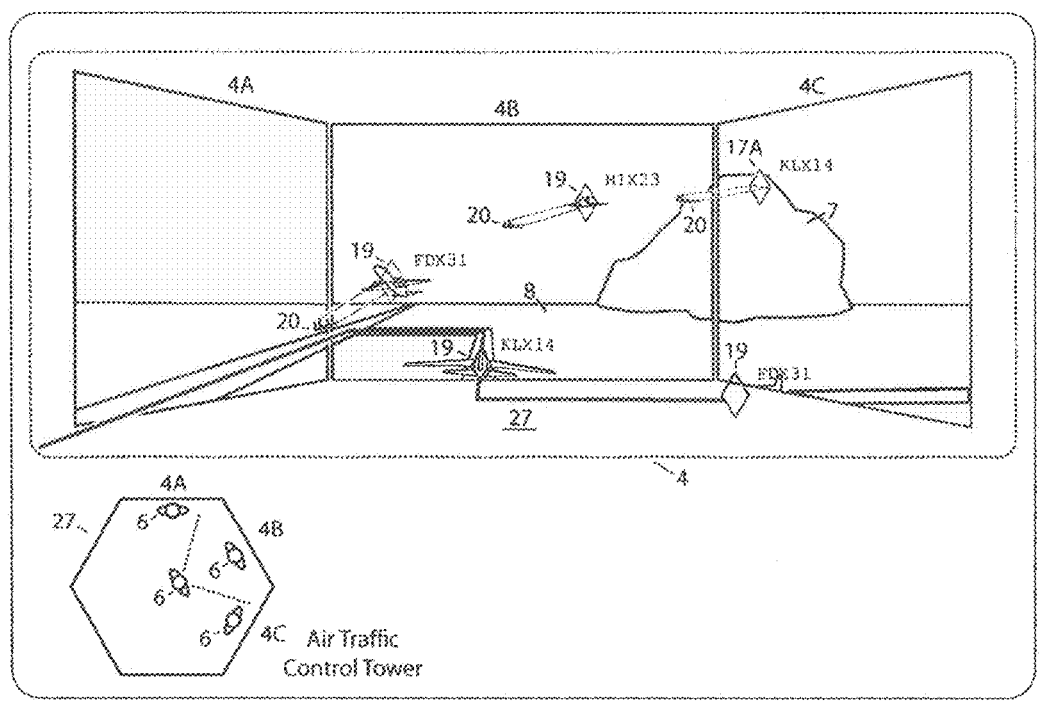
FIG. 7 is an illustration of an Air Traffic Control (ATC) tower view without aircraft flight plan and ATC entered flight procedures, in accordance with another embodiment of the present disclosure.
Figure 20:
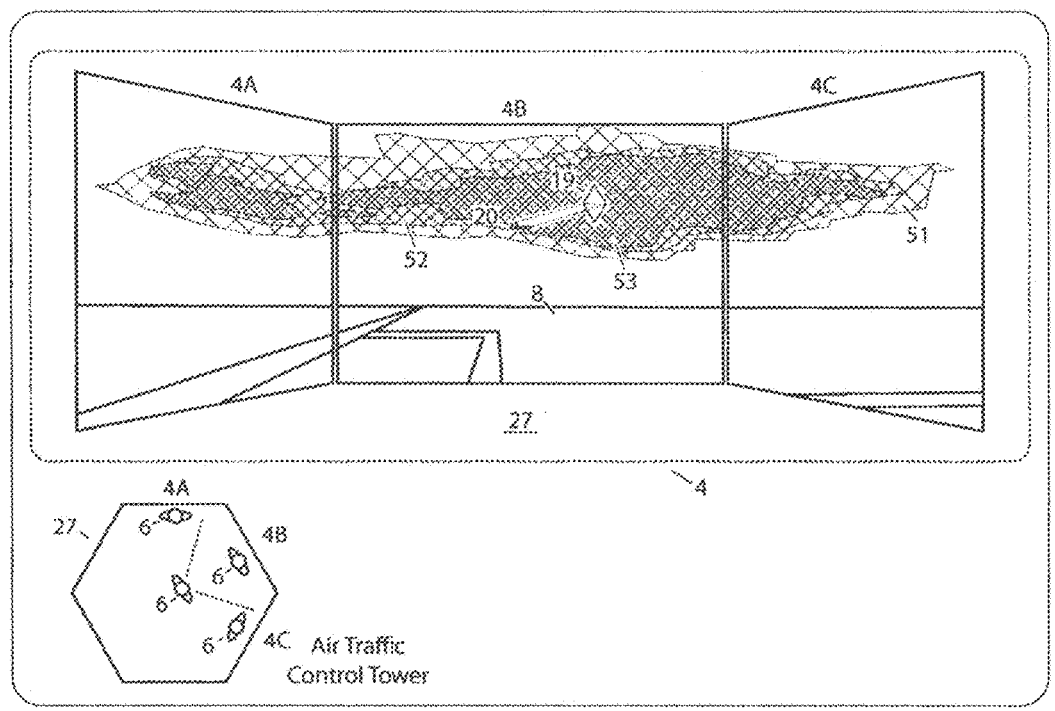
FIG. 20 is an illustration of an ATC Tower view with weather, in accordance with another embodiment of the present disclosure.

Three planar windows (4A, 48, and 40) with a HUD360 1 display view 4 are shown from inside an ATC tower in FIG. 7 where three aircraft 19 in window 48 with a third aircraft 19 in window 40 occluded by non-critical mountain surface 7 with predicted position vectors 20 and a forth aircraft 19 shown at bottom of window 40. Also shown in FIG. 7 is a top view of the ATC tower with four viewing positions shown inside the tower, where 4A, 48, and 40 are the tower windows, with the upper portion of FIG. 7 as the center perspective centered on window 48, with window 4A and 40 also in view. Although not shown in FIG. 7 through 11, all window surfaces (Omni-directional) of the ATC tower windows can have a fixed HUD display surface 4 where the augmented view can apply, and further a see-through or opaque HUD 4 on the ceiling of the tower can also be applied as well as out of sight aircraft indicators (17A and 17B) displayed on the edge of the display nearest the out-of-sight aircraft position, or another example with HUD360 lightweight goggles 1 can be used in place of the fixed HDD's. Safe terrain surface 8 and safe mountain surface 7 is shown in FIGS. 7 through 11 and safe terrain surface 8 is shown in FIG. 20. Although not shown in FIG. 7 through 11 and in FIG. 20, critical surfaces 9,10, cautionary terrain surfaces 13, and critical structures 22 can be augmented and displayed to the ATC personnel to make more informative decisions on optimizing the direction and flow of traffic.

Figure 8:
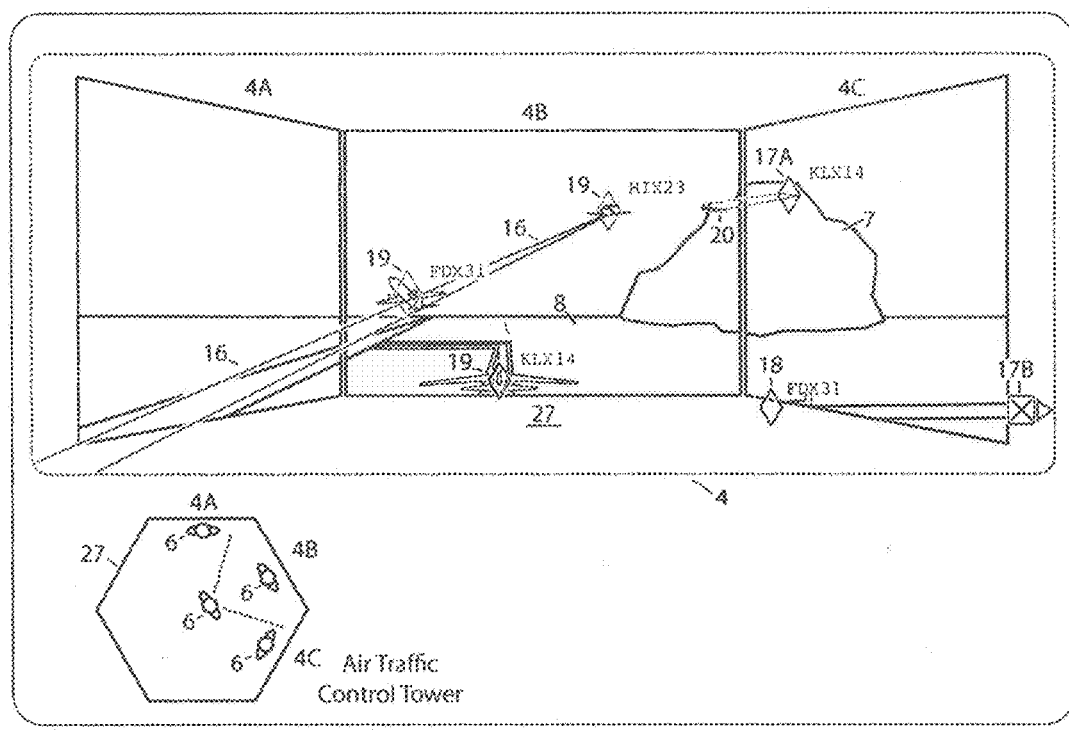
FIG. 8 is an illustration of an ATC tower view with flight data, in accordance with another embodiment of the present disclosure.

FIG. 8 shows a total of six aircraft being tracked see-through display view 4 from an ATC tower perspective. Three aircraft 19 are shown in-sight through ATC window 4B that are not on collision courses with flight plan paths 16 shown. In ATC window 40 an out of sight aircraft 17A occluded by non-critical mountain surface 7 is shown with predicted position vector 20. Also shown in FIG. 8, through window 40, is out of sight indication 17B of a collision bound aircraft heading towards probable collision aircraft 18 augmented on bottom of window 40.

Figure 9:
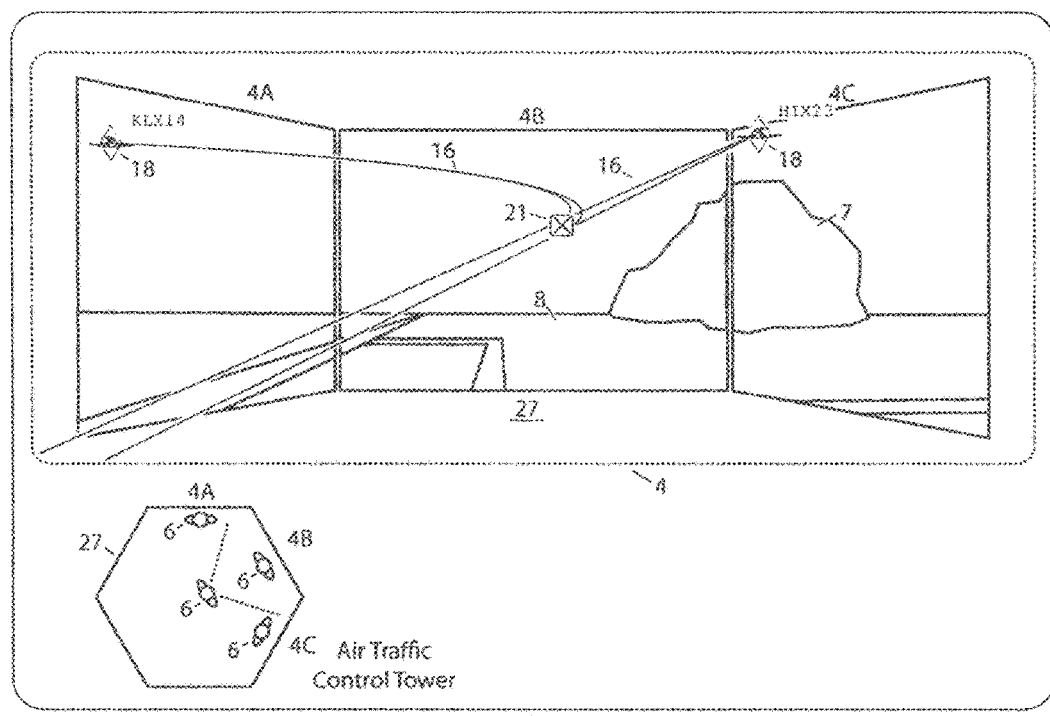
FIG. 9 is an illustration of an ATC tower view with flight data and air collision avoidance alert, in accordance with another embodiment of the present disclosure.

FIG. 9 shows an ATC tower 27 see-through display view 4 from a user 6 looking at ATC windows 4A, 48, and 40 where two aircraft 18 on a predicted air collision course point 21 along flight plan paths 16 derived from flight data over safe terrain 8 and safe mountain surface 7.

Figure 10:
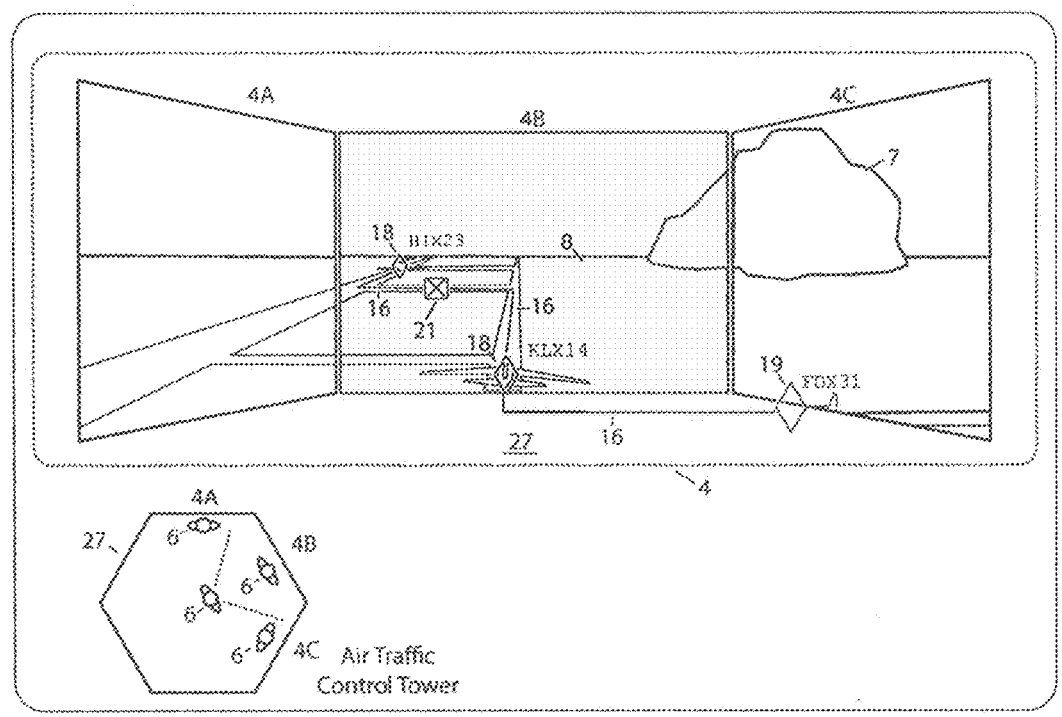
FIG. 10 shows ATC tower view with flight data and ground collision avoidance alert, in accordance with another embodiment of the present disclosure.

FIG. 10 shows an ATC tower 27 see-through display view 4 with a predicted ground collision point 21 between two aircraft 18 with flight plan paths 16 on safe surface 8 with safe mountain surface 7 shown. User 6 see-through display view 4 is shown from user seeing through ATC windows 4A, 48, and 40. Aircraft 19 that is not on a collision course is shown through ATC window 40.

Figure 11:
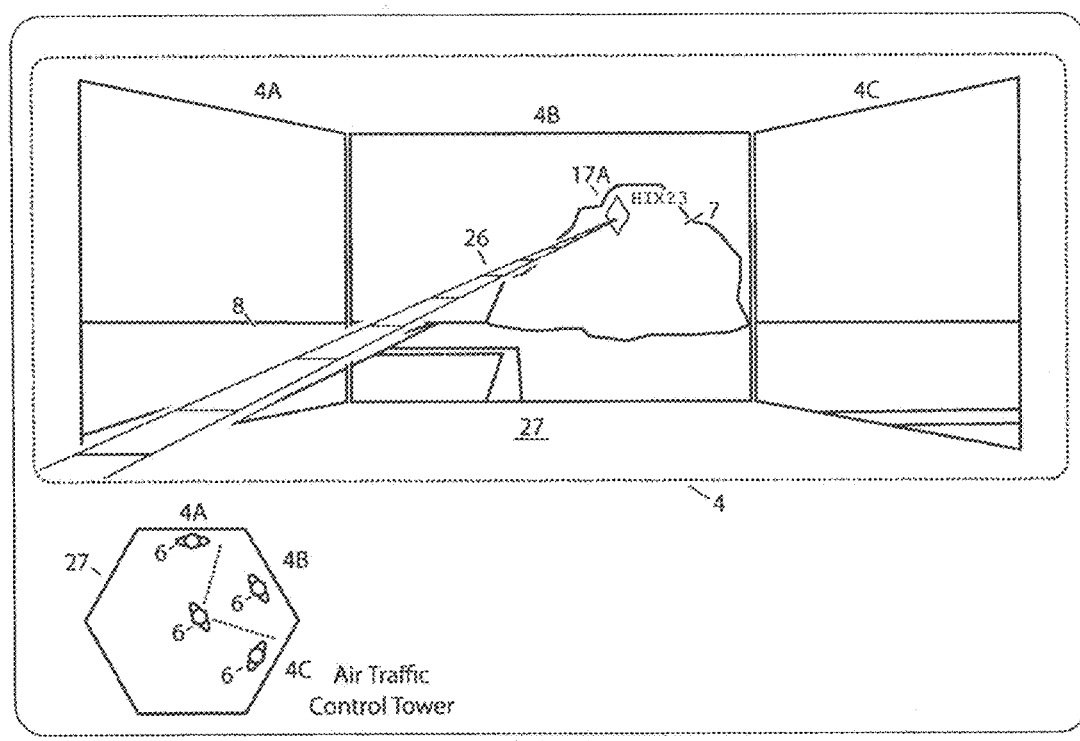
FIG. 11 is an illustration of an ATC tower view with lost signal and coasting, in accordance with another embodiment of the present disclosure.

FIG. 11 shows an ATC tower 27 see-through display view 4 from user 6 seeing through ATC windows 4A, 48, and 40. An aircraft 17A is occluded by a determined as safe mountain terrain surface 7 from last known flight data, where the flight data is latent, with the last predicted flight plan path 26 shown over safe terrain surface 8. The safe mountain terrain surface 7 is identified as safe in this example and in other examples in this disclosure, because the last known position of the aircraft was far enough behind the mountain for it not to be a threat to the aircraft 17 A.

Figure 12:
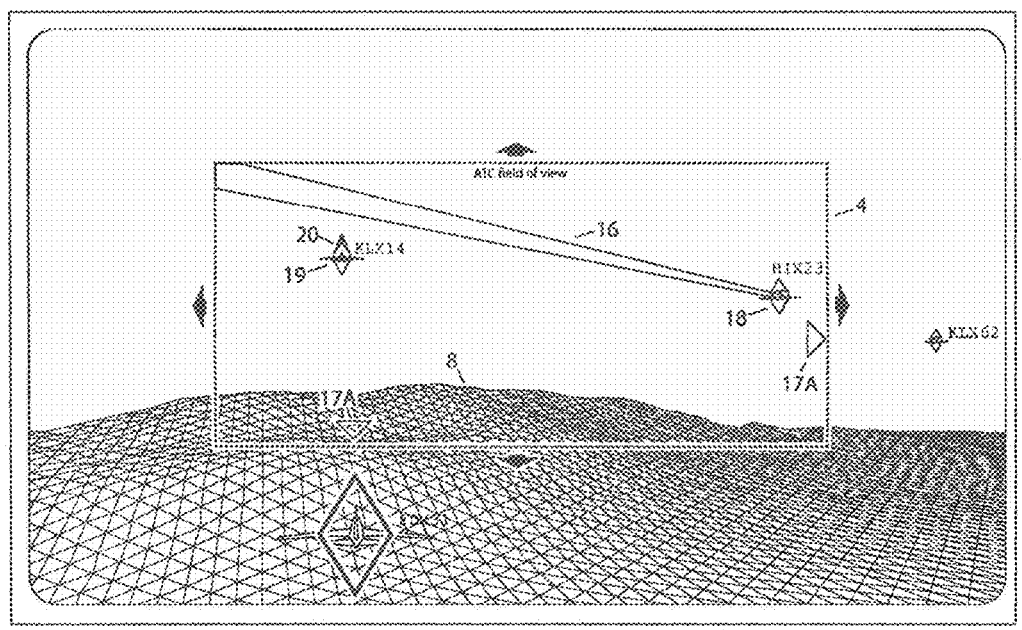
FIG. 12 is an illustration of an ATC Regional Control Center (RCC) view, in accordance with another embodiment of the present disclosure.

For regional ATC perspective, FIG. 12 demonstrates a telepresence view of a selected aircraft on an ATC display field of view 4 (with the ATC HUD360 1 display view 4 in opaque or remote mode) over probable safe terrain surface 8 with one aircraft 19 in sight with predicted position vector 20 shown, that is not on a collision course. A second aircraft 18 in sight and on a collision course from aircraft predicted position data is shown (with collision point 21 outside of view and not shown in FIG. 20). Out of sight aircraft indicators 17A are shown on the bottom and right sides of the ATC field of view display 4 to indicate an aircraft outside of display view 4 that are not on a collision course. The ATC regional HUD360 1 user 6 (not shown) can move the display view 4 (pan, tilt, zoom, or translate) to different regions in space to view different aircraft in real-time, such as the aircraft shown outside display view 4 and rapidly enough to advert a collision.

Figure 13:
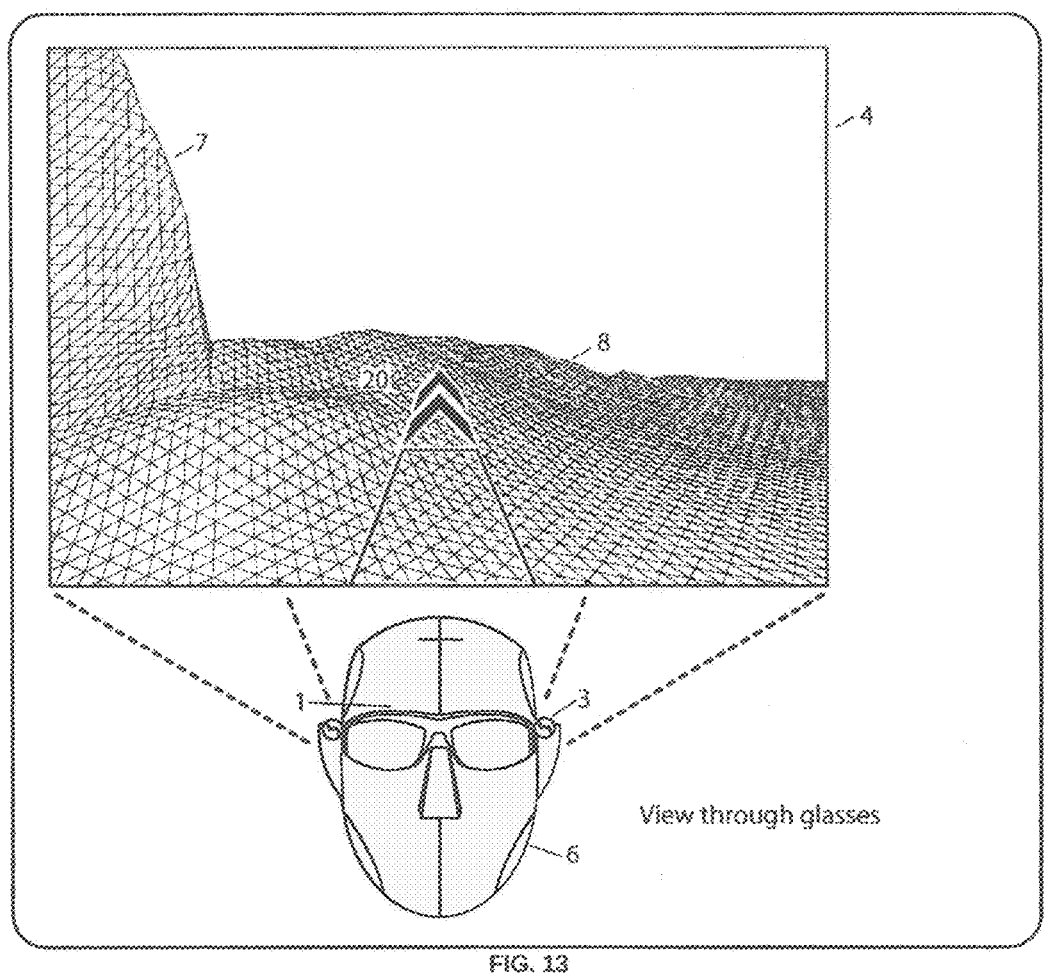
FIG. 13 is an augmented pilot view with predicted position vector shown with no other outside aircraft data, in accordance with another embodiment of the present disclosure.

FIG. 13 shows a pilot display view 4 with predicted position vector 20 over safe terrain surface 8, but no flight plan data is displayed.

Figure 14:
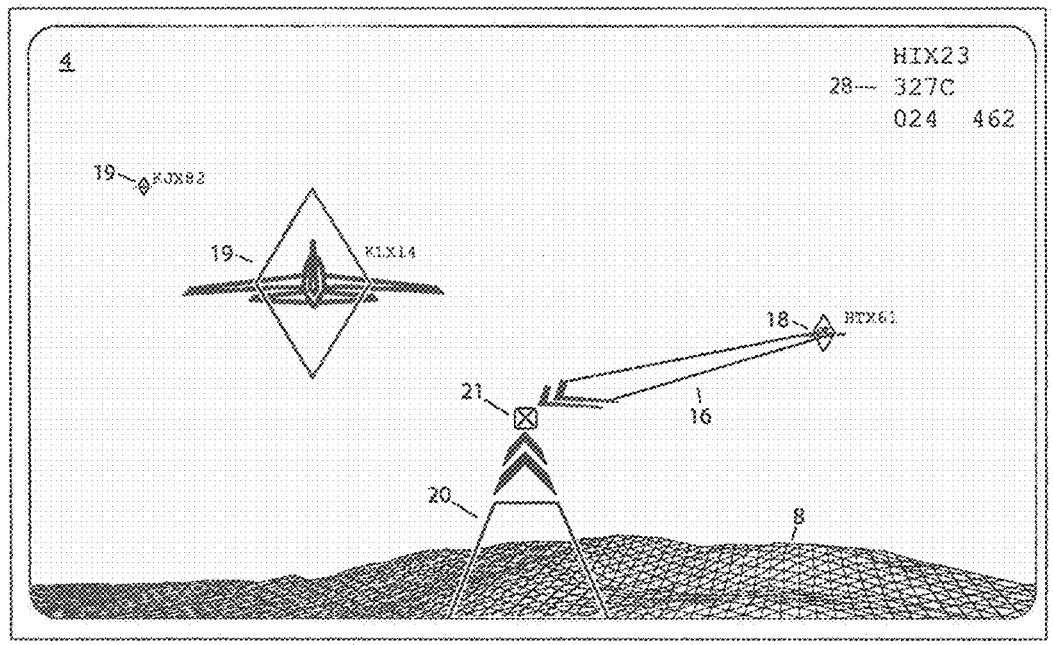
FIG. 14 is an illustration of an ATC/RCC pilot's view from aircraft perspective, in accordance with another embodiment of the present disclosure.

FIG. 14 provides an ATC or Regional Control Center (RCC) display view 4 of a selected aircraft identified 28 showing predicted aircraft predicted position vector 20 over safe terrain surface 8 along with two in-sight aircraft 19 that are not on a collision course, and a third in-sight aircraft 18 that is on a predicted collision point 21 course along flight plan path 16.

FIGS. 15, 16, 17, 18, and FIG. 19 demonstrate a display view 4 of different battlefield scenarios where users can zoom into a three dimensional region and look at and track real time battle field data, similar to a flight simulator or "Google Earth" application but emulated and augmented with real-time data displayed, as well as probable regional space status markings displayed that can indicate degree of danger such as from sniper fire or from severe weather. The system user can establish and share telepresence between other known friendly users of the system, and swap control of sub-systems such as a zoom-able gimbaled camera view on a vehicle, or a vehicle mounted gimbaled weapon system if a user is injured, thereby assisting a friendly in battle, or in a rescue operation. Users of the system can also test pathways in space in advance to minimize the probability of danger by travelling through an emulated path in view 4 accelerated in time, as desired, identifying probable safe spaces 34 and avoiding probable cautious 35 and critical 36 spaces that are between the user's starting point and the user's planned destination. A user can also re-evaluate by reviewing past paths through space by emulating a reversal of time. The identification of spaces allows the user to optimize their path decisions, and evaluate previous paths.

Figure 15:
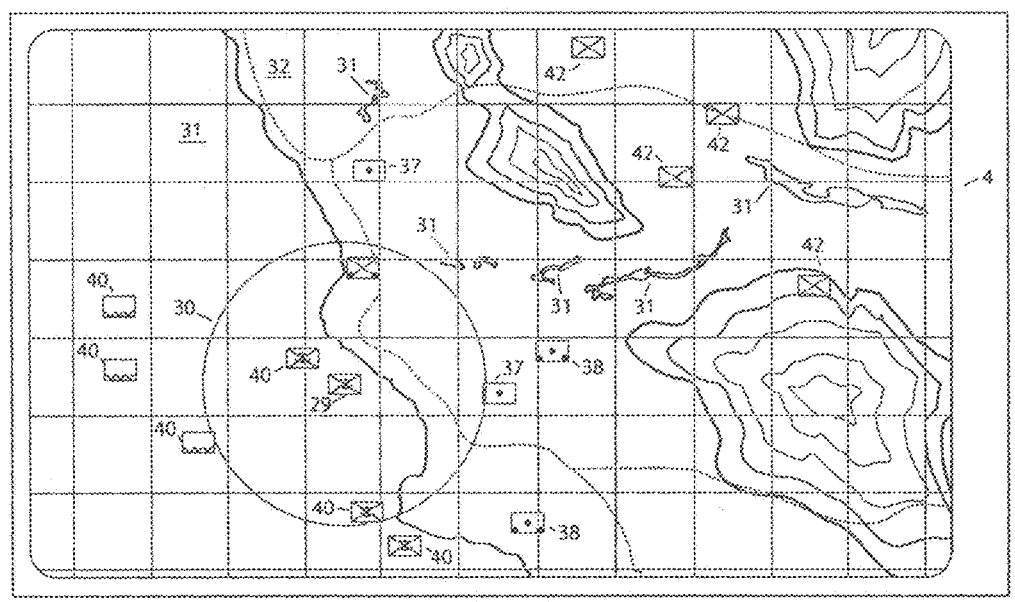
FIG. 15 is an illustration of a military battlefield view, showing a Map view, in accordance with another embodiment of the present disclosure.

In FIG. 15 battlefield data of all unit types is shown on a three-dimensional topographical display view 4 in real time where a selected military unit 29 is highlighted to display pertinent data such as a maximum probable firing range space 30 over land 32 and over water 31. The probable unit maximum firing range space 30 can be automatically adjusted for known physical terrain such as mountains, canyons, hills, or by other factors depending on the type of projectile system. Unit types in FIG. 15 are shown as probable friendly naval unit 40, probable friendly air force unit 37, probable friendly army unit 38, and probable unfriendly army unit 42.

Figure 16:
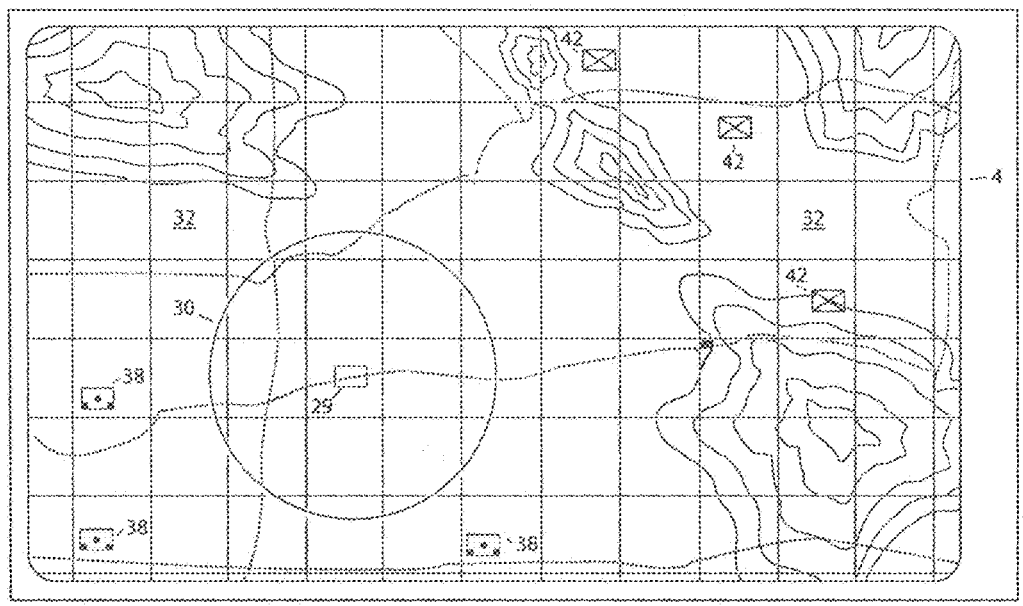
FIG. 16 is an illustration of a military battlefield view, showing a Map view: Army Operations, in accordance with another embodiment of the present disclosure.

FIG. 16 shows an aerial battlefield view 4 with selected unit 29 on land 32. The selected unit 29 is identified as a probable motorized artillery or anti-aircraft unit with a probable maximum unit firing space 30 near probable friendly army units 38. Probable unfriendly army units are shown on the upper right area of FIG. 16.

Figure 17:
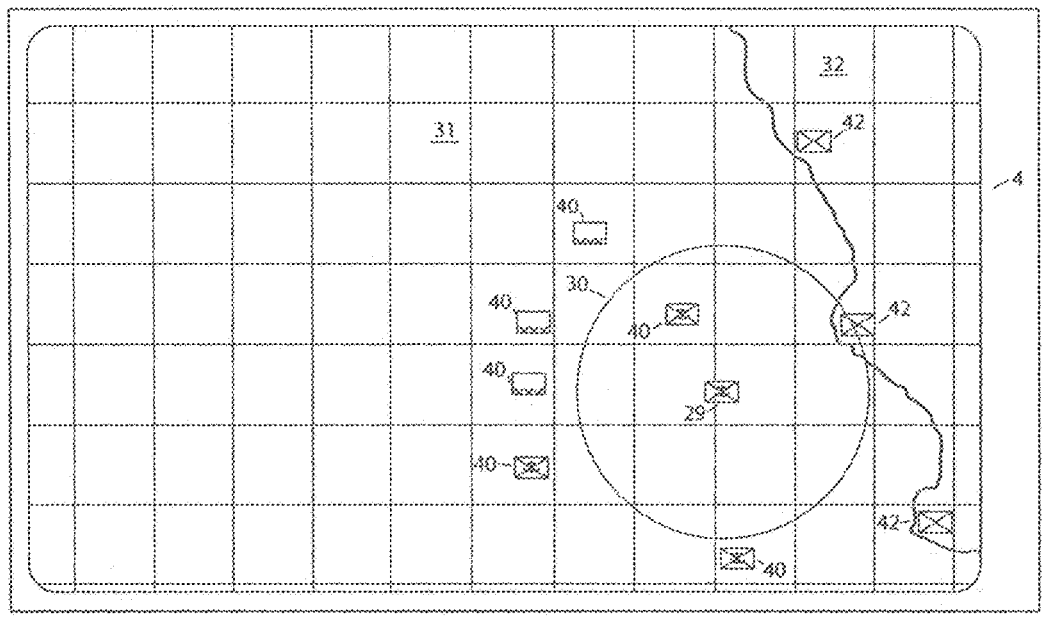
FIG. 17 is an illustration of a military battlefield view, showing a Map view: Naval Operations, in accordance with another embodiment of the present disclosure.

FIG. 17 shows a naval battlefield view 4 with selected unit 29 on water 31 with probable firing range 30 along with probable friendly navy units 40 along with probable unfriendly army units 42 on land 32.

FIG. 18 shows a military battlefield view 4 with probable friendly army units 38 and out of sight probable friendly army unit 38A, and probable unfriendly air-force unit 41 being intercepted by probable friendly air-force unit 37 (evidence of engagement, although not explicitly shown in the FIG., such as a highlighted red line between probable unfriendly air-force unit 41 and probable friendly air-force unit 37, or some other highlight, can be augmented to show the engagement between units). Probable safe spaces ("green zone") 34, probable cautious battle spaces ("warm yellow zone") 35, and probable critical battle spaces ("red hot zone") 36, all of which are weighted in probability by time and reporting, are also shown in FIG. 18. The battle space status types 34, 35, and 36, can be determined by neural network, fuzzy logic, known models, and other means with inputs of reported weighted parameters, sensors, and time based decaying weights (older data gets deemphasized where cyclical patterns and recent data get amplified and identified). Unit types are not limited to the types described herein but can be many other specific types or sub-types reported, such as civilian, mobile or fixed anti-aircraft units, drones, robots, and mobile or fixed missile systems, or underground bunkers. Zone space type identification can be applied to the other example applications, even though it is not shown specifically in all of the figures herein. The terrain status types are marked or highlighted on the display from known data sources, such as reports of artillery fire or visuals on enemy units to alert other personnel in the region of the perceived terrain status.

Figure 19:
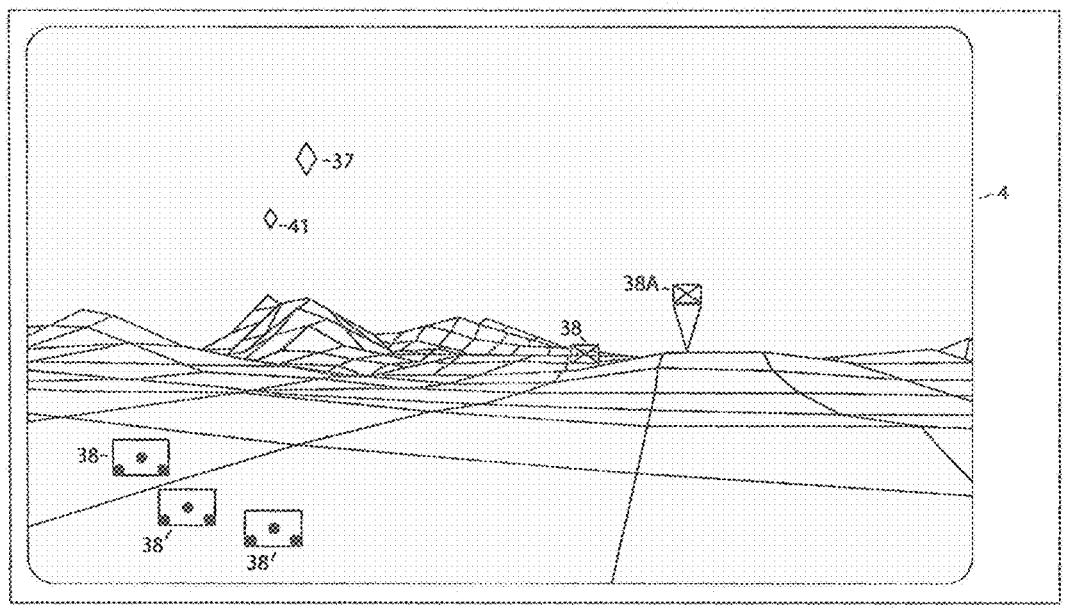
FIG. 19 is an illustration of a military Control Center (MCC) view from battlefield perspective, in accordance with another embodiment of the present disclosure.

In FIG. 19 a Military Control Center (MCC) perspective view 4 of a battle space with zone spaces not shown but with probable friendly army units 38 and out of sight probable friendly army unit 38A, and probable unfriendly air-force unit 41 being intercepted by probable friendly air-force unit 37.

FIGS. 20, 21, 22, and 23 show weather spaces in ATC, pilot, ground, and marine views 4. In FIG. 20, an ATC tower 27 display view 4 with an out of sight aircraft 17A with probable predicted non-collision course predicted position vector 20 but is occluded by critical weather space 53 (extreme weather zone, such as hurricane, tornado, or typhoon) above probable safe terrain surface 8. Other weather spaces marked as probable safe weather space 51 (calm weather zone), and probable cautious weather space 52 (moderate weather zone) are all shown in FIG. 20. A top-down view of ATC tower 27 is shown on the bottom left of FIG. 20 with multiple users' 6 viewing through ATC windows 4A, 4B, 40.

Figure 21:
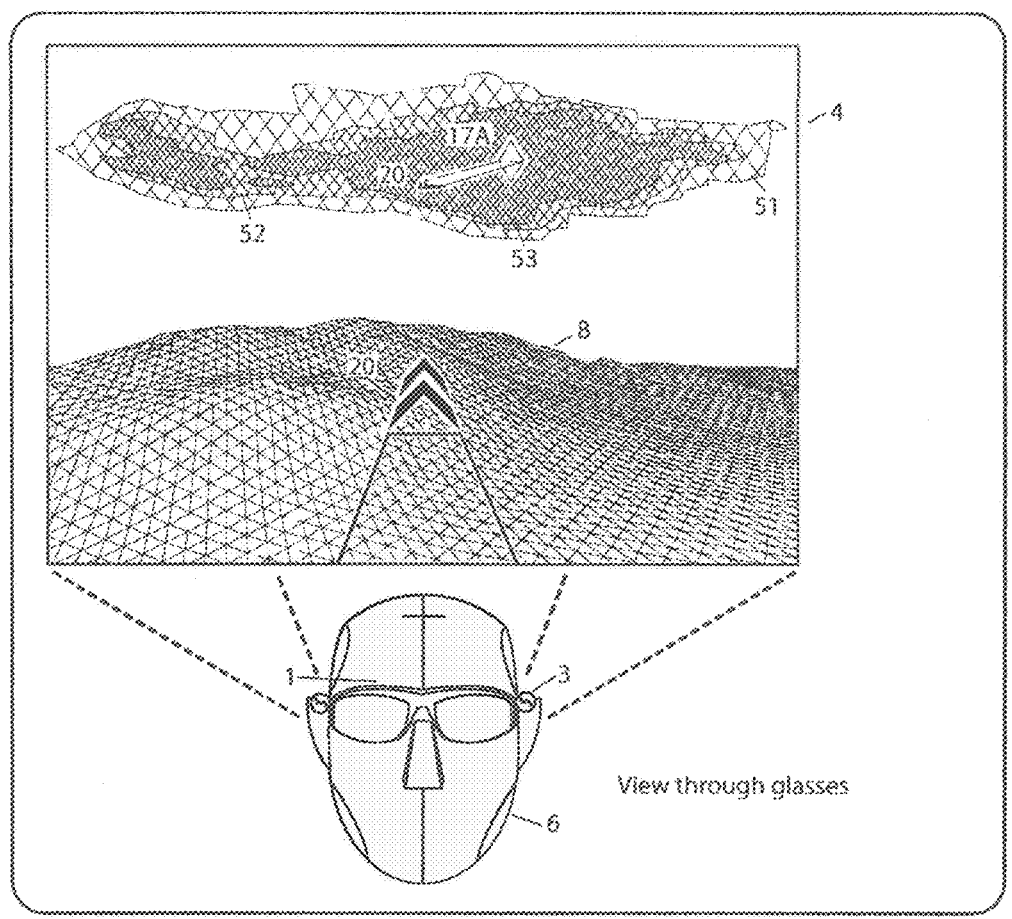
FIG. 21 is an illustration of a pilot view with weather, in accordance with another embodiment of the present disclosure.

In FIG. 21 is a pilot display view 4 with an out of sight aircraft 17A not on a predicted collision course, but occluded directly behind critical weather space 53 but near probable safe weather space 51 and probable cautious weather space 52. Also shown are probable safe terrain surface 8 and pilots' probable predicted position vectors 20.

Figure 22:
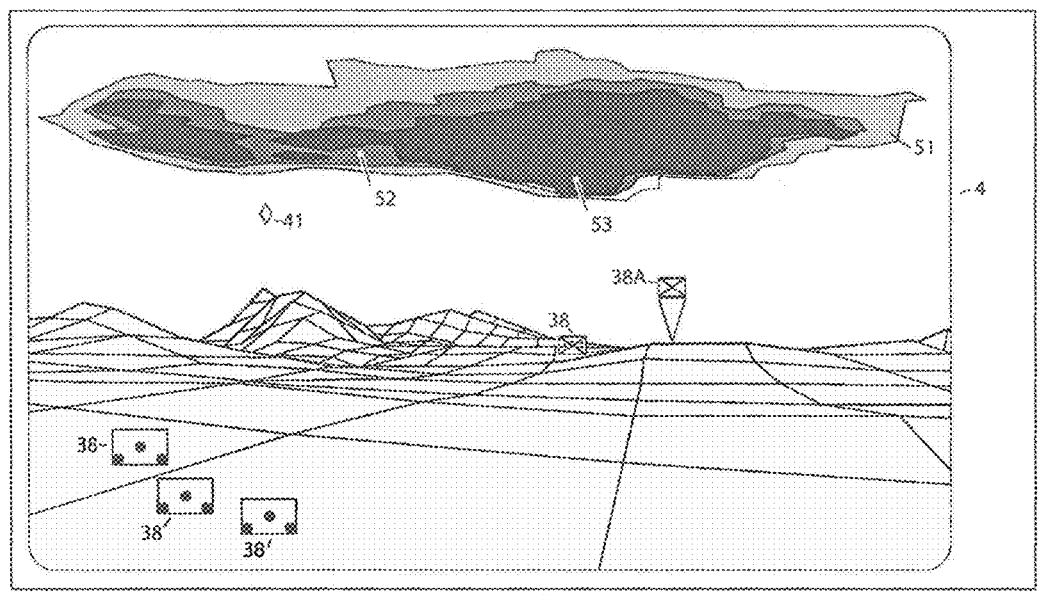
FIG. 22 is an illustration of a battlefield view with weather, in accordance with another embodiment of the present disclosure.

In FIG. 22 is a battle field view 4 with weather spaces marked as probable safe weather space 51, probable cautious weather space 52, and probable critical weather space 53 with probable unfriendly air force unit 41 and probable friendly in-sight army units 38. Although not shown, probable friendly and probable unfriendly units can be identified and augmented with highlights such as with different colors or shapes and behavior to clarify what type (probable friendly or probable unfriendly) it is identified as. Many techniques can be used to determine if another unit is probably friendly or probably not friendly, such as time based encoded and encrypted transponders, following of assigned paths, or other means.

Figure 23:
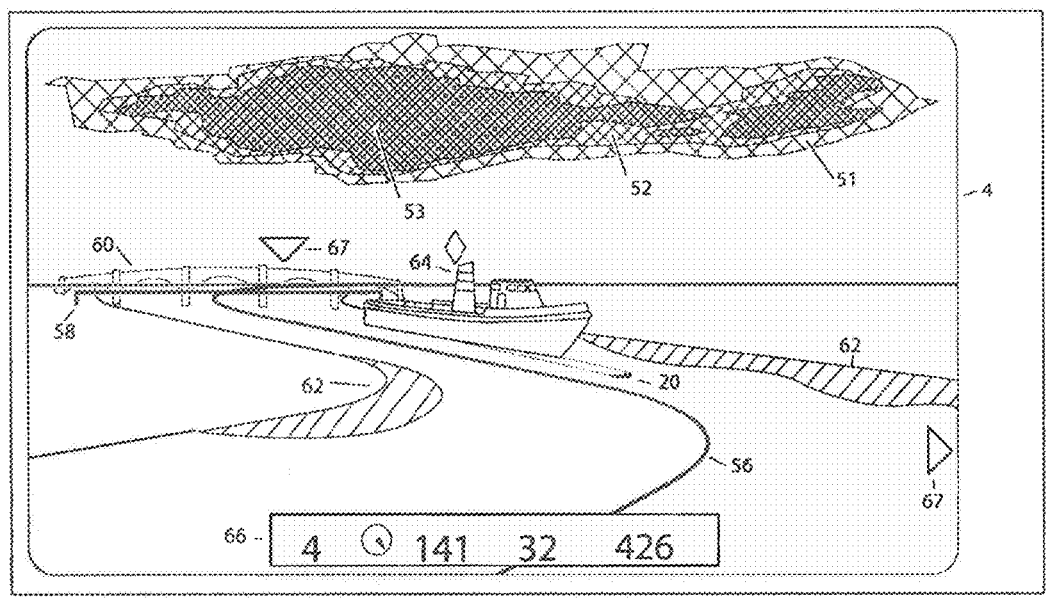
FIG. 23 is an illustration of a HUD360 application for navigating on a river, bay, or ocean with distance to object displayed, in accordance with another embodiment of the present disclosure.

In FIG. 23 a HUD360 1 marine application is shown through display view 4 having navigation path plan 56 with approaching ship 64 with predicted position vector 20, dangerous shoals 62, essential parameter display 66, bridge 60, unsafe clearance 58, an out-of-sight ship indicator 67 behind bridge 60 and at bottom right of display view 4. Also shown are critical weather space 53, probable safe weather space 51, and probable cautious weather space 52. Not shown in FIG. 23 but display view 4 can be augmented with common National Oceanographic and Atmospheric Administration (NOAA) chart data or Coastal Pilot items such as ship wrecks, rocky shoals, ocean floor types or other chart data. This is also applicable for aviation displays using similar augmentation from aeronautical chart data. Also not shown in FIG. 23, but can be augmented is the surface and depth of the floor of the ocean, river, or channel, or lake, along with tidal, river, or ocean current vectors on the water, known probable fishing net lines, moors, wind direction and magnitude indication, navigation buoy augmentations, as well as minimum and maximum tide levels.

Figure 24:
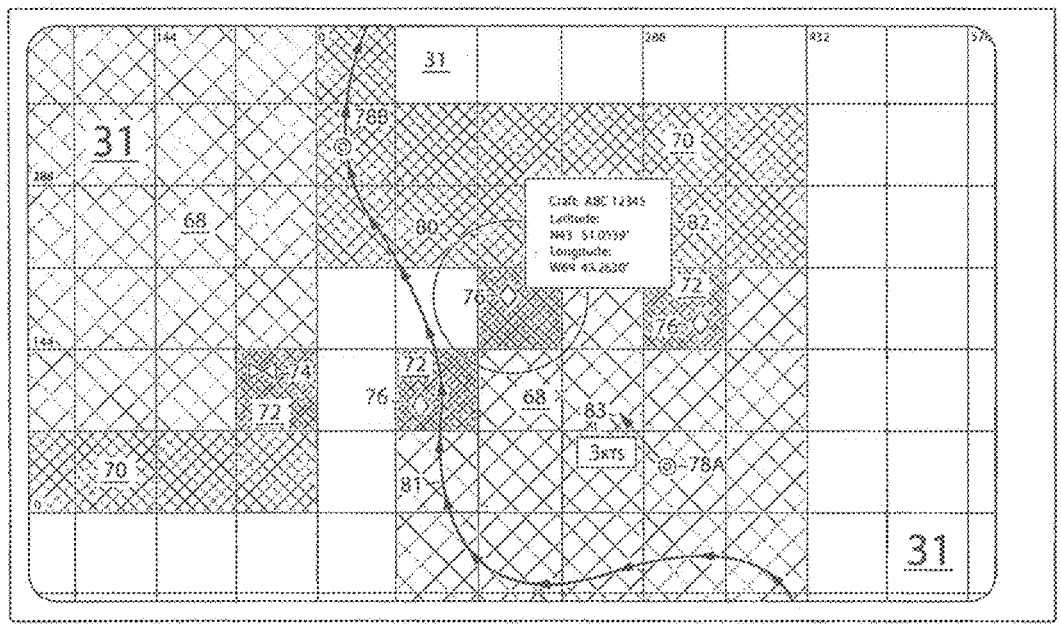
FIG. 24 is an illustration of a HUD360 application optimizing a search and rescue operation with a team of coast guard vessels optimized coordination of search areas with current flows identifying explored and unexplored areas, in accordance with another embodiment of the present disclosure.

In FIG. 24 display view 4 shows a high level view of a coast guard search and rescue operation over water 31 with a search vessel 76 rescue path 81 that found initial reported point of interest 78A identified in an area already searched 68 and projected probable position of point of interest 78B in unsearched area along planned rescue path 81 based on prevailing current vector 83. A prevailing current flow beacon (not shown in FIG. 24) can be immediately dropped into the water 31, to increase the accuracy of prevailing current flows to improve the probability of the accuracy of predicted point of interest 78B. Improvement to the accuracy of the predicted point of interest 78B position can be achieved by having a first on arrival high speed low flying aircraft drop a string of current flow measuring beacon floats (or even an initial search grid of them) with Global Positioning System (GPS) transponder data to measure current flow to contribute to the accuracy of the predicted drift position in the display.

The known search areas on the water are very dynamic because of variance in ocean surface current that generally follows the prevailing wind, but with a series of drift beacons with the approximate dynamics as a floating person dropped along the original point of interest 78A (or as a grid), this drift flow prediction can be made much more accurate and allow the known and planned search areas to automatically adjust with the beacons in real-time. This can reduce the search time and improve the accuracy of predicted point of interest 78B, since unlike the land, the surface on the water moves with time and so would the known and unknown search areas.

An initial high speed rescue aircraft (or high speed jet drones) could automatically drop beacons at the intersections of a square grid (such as 1 mile per side, about a 100 beacons for 10 square miles) on an initial search, like along the grid lines of FIG. 24 where the search area would simply be warped in real-time with the position reports fed back from the beacons to re-shape the search grid in real time. Each flow measuring beacon can have a manual trigger switch and a flashing light so if a swimmer (that does not have a working Emergency Position Indicating Radio Beacon-EPIRB device) capable of swimming towards the beacon sees it and is able to get near it to identify they have been found.

People are very hard to spot in the water even by airplane, and especially at night, and what makes it even more challenging is the currents move the people and the previously searched surfaces.

Another way to improve the search surface of FIG. 24 (and can be applied in other applications is use by border agents and by military to spot unfriendly's, friendly's, or intruders) can be by having a linear array of high powered infrared capable telescopic cameras (like an insect eye) mounted on a high speed aircraft zoomed (or telescoped) way-in, much farther than a human eye (like an eagle or birds eye, but having an array of them, such as 10, 20, or more telescopic views) and use high speed image processing for each telescopic camera to detect people. The current flow beacons as well as data automatically processed and collected by the telescopic sensor array can be used to augment the HUD360 1 see through display view 4.

Figure 25:
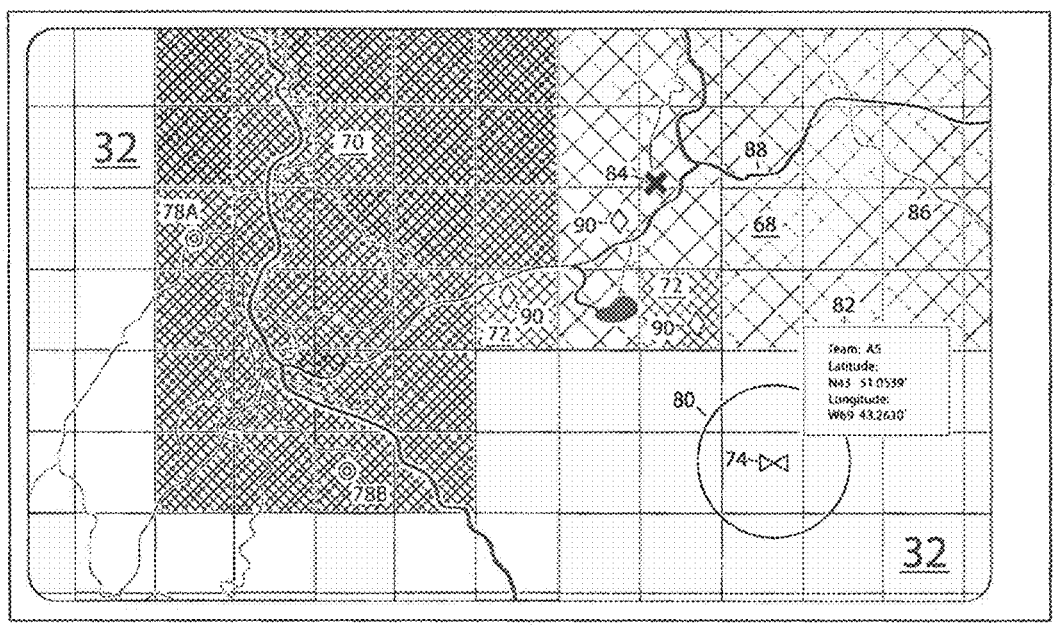
FIG. 25 is an illustration of a HUD360 application for a team of search and rescue units on a mountain displaying explored and unexplored areas, in accordance with another embodiment of the present disclosure.

A ground search application view 4 of HUD360 1 is shown in FIG. 25 where a last known reported spotting of a hiker 84 was reported near ground search team positions 90 and rivers 88. The hikers reported starting position 78A and destination position 78B reported planned are shown along hiking trails 86. Search and rescue aircraft 74 is shown as selected search unit with selected data 82 shown. Although not shown in FIG. 25 the searched areas and searched hiking trails can be marked with appropriate colors to indicate if they have already searched and have the colors change as the search time progresses to indicate they may need to be searched again if the lost hiker has moved into that area based on how far nearby unsearched areas or trails are and a probable walking speed based on the terrain.

Figure 26:
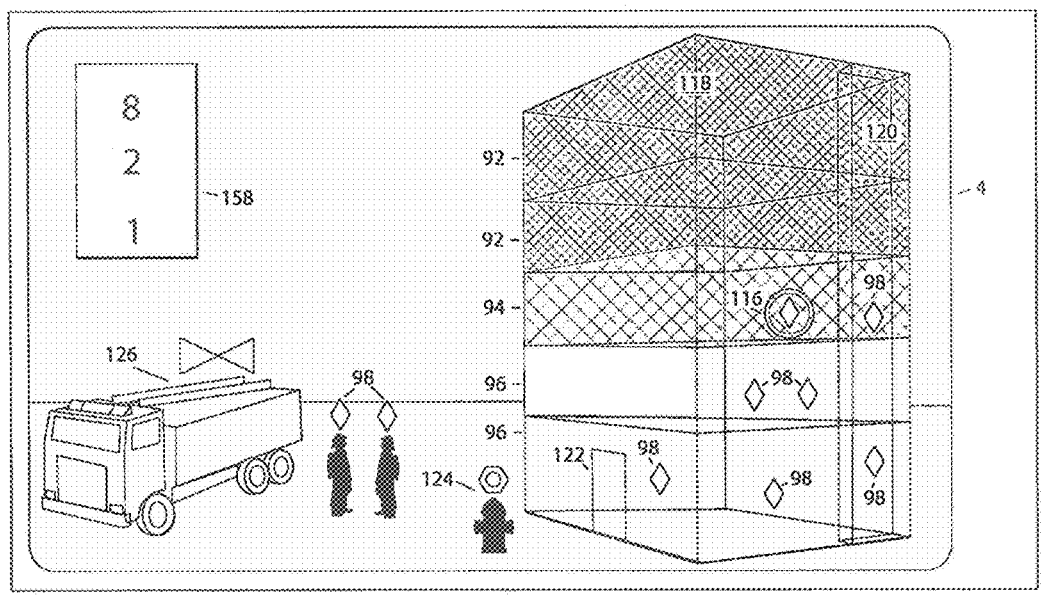
FIG. 26 is an illustration of a HUD360 application for a team of firefighters, police, or swat team in a multi-story building, in accordance with another embodiment of the present disclosure.

FIG. 26 shows an emergency response in see-through display view 4 to a building 118 under distress shown with stairwell 120, fire truck 126, fire hydrant 124, and main entrance 122. Inside the building 118 are floors in unknown state 92, floors actively being searched 94 and floors that are cleared 96. Firefighters 98 are shown outside and on the first three floors, with a distress beacon activated 116 on a firefighter on the third actively searched floor 94. Communications between HUD360 1 units can be achieved by using appropriate frequency bands and power levels that allow broadband wireless signals to propagate effectively and reliably through various building 118 structures, and repeaters can be added if necessary or the HUD360 1 itself can be used as a repeater to propagate broadband real-time data throughout the system.

Broadcast data can also be sent to all HUD360 1 user's to order a simultaneous evacuation or retreat if sensors and building engineers indicate increasing probability of a building on the verge of collapsing or if some other urgency is identified, or just to share critical data in real-time.

Figure 27:
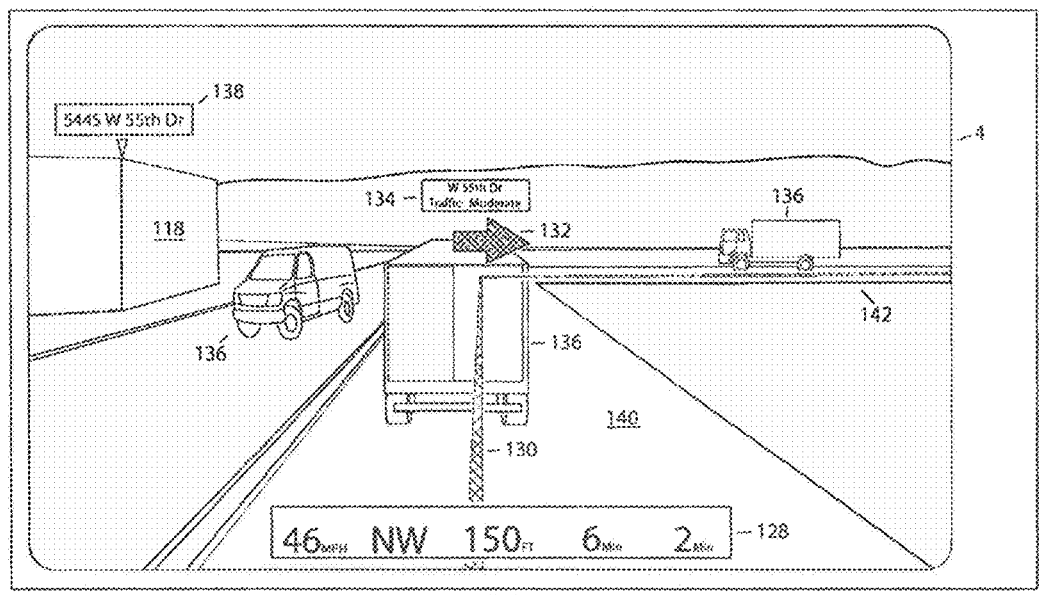
FIG. 27 is an illustration of a HUD360 application for emergency vehicles to optimize routing through traffic, in accordance with another embodiment of the present disclosure.

FIG. 27 shows a ground vehicle application view 4 of the HUD360 1 where a ground vehicle parameter display 128 is augmented onto the see-through display 4 on top of road 140 and planned route 130. Other vehicles 136 are shown on the road and can be augmented with data, such as speed and distance, as appropriate but not shown in FIG. 27. Upcoming turn indicator 132 is shown just below street and traffic status label 134 for road 142 to be turned on. Address label 138 is shown augmented on display 4 in the upper left of FIG. 27 used to aid the driver in identifying the addresses of buildings. The address label can be augmented to the corner of the building 118 by image processing such as segmentation of edges and known latitude and longitude of the building 118.

Figure 28:
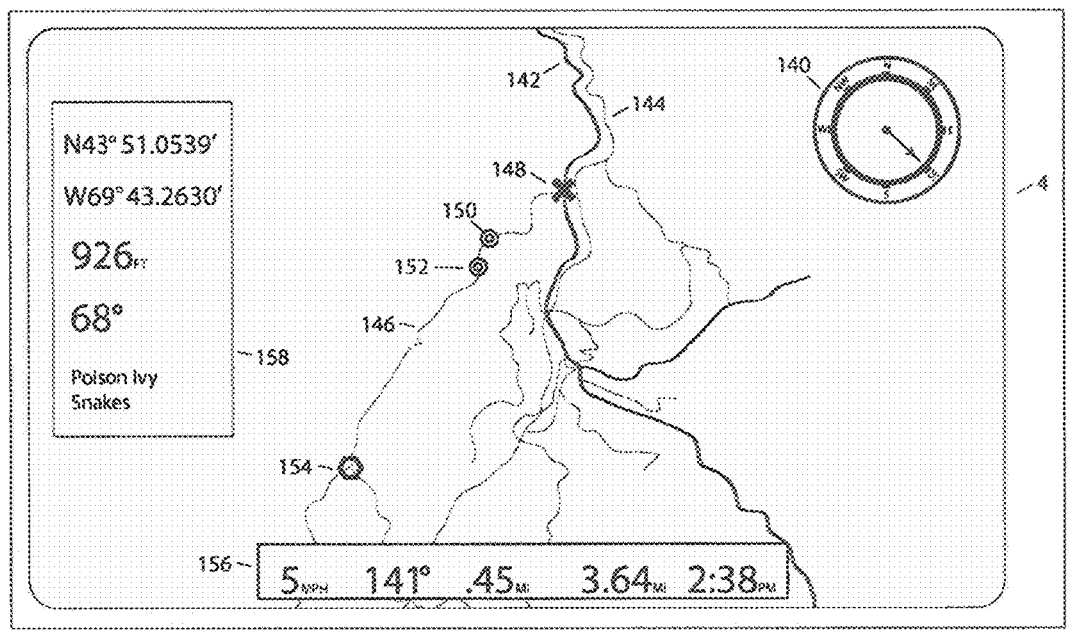
FIG. 28 is an illustration of a HUD360 application for leisure hikers, in accordance with another embodiment of the present disclosure.

FIG. 28 shows a leisure hiking application view 4 of the HUD360 1 goggles in opaque mode with a map of the current hiking area with real time compass display 140, bottom parameter display 156 and side display 158 all of which can be augmented onto goggle display view 4 in see-through mode in addition to opaque mode shown in FIG. 28. Also shown in the display view 4 are rivers 142, inactive hiking trails 144 and active hiking trails 146. A destination cross-hair 148 is shown near the current position 150 with position of others in a group are shown as 152. A point of origin 154 is also shown near bottom left of trails 146 on display view 4. Various highlights of color not shown in FIG. 28 can be used to augment different real-time data or different aspects of the display view 4.

Figure 29:
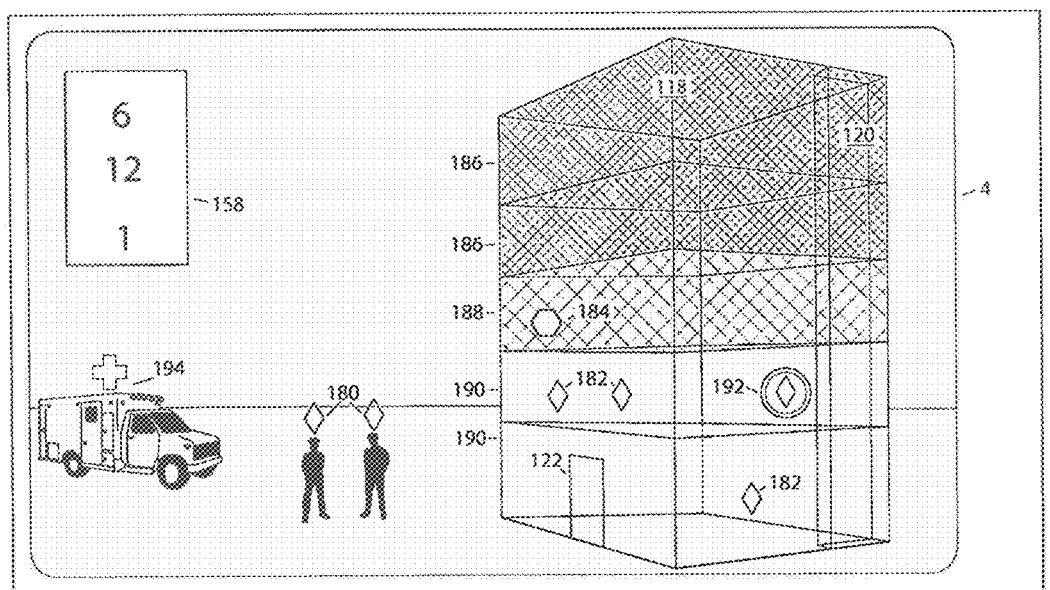
FIG. 29 is an illustration of a HUD360 application for a police/swat hostage rescue operation, in accordance with another embodiment of the present disclosure.

FIG. 29 shows a police or swat team application of a HUD360 1 see-through display view 4 with a side display augmentation 158 showing pertinent data relevant to the situation, with an emergency vehicle 194, police units on sight 180 with a building 118 in view. Inside the building police units not visible 182 are augmented on the first two floors marked as safe floors 190, where on the first floor a main entrance 122 is augmented. A second floor is shown augmented with an emergency beacon 192 as activated, and on the third floor is a probable hostage location 184 marked as the possible hostage floor 188. The top two floors (fifth and sixth) are marked as unknown floors 186, where the statuses of those floors are not currently known. Each personnel inside and outside the building or elsewhere can also be utilizing a HUD360 1 to assess the situation and better coordinate a rescue operation.

Figure 30:
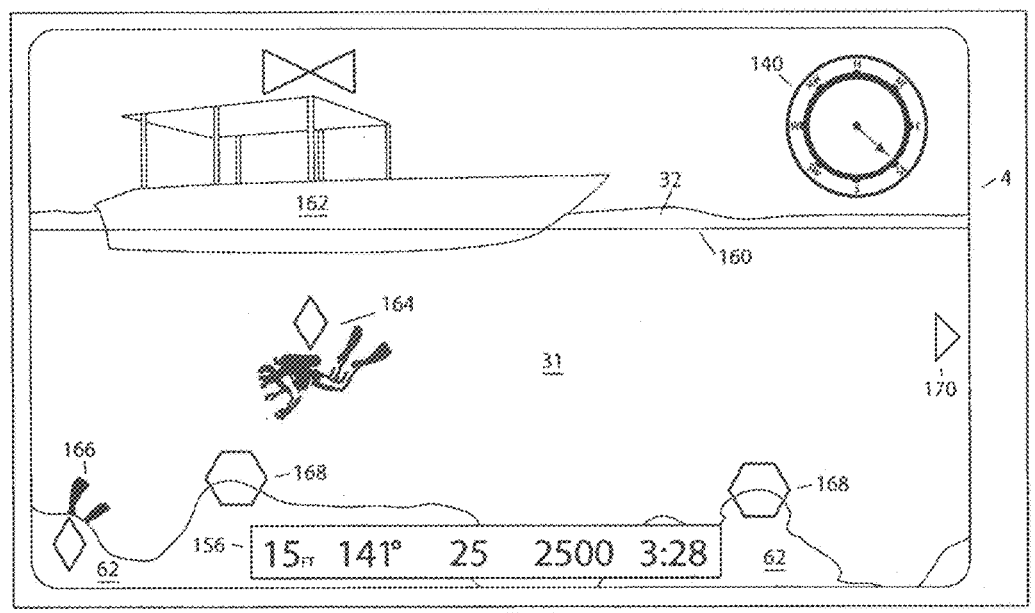
FIG. 30 is an illustration of a HUD360 application for leisure scuba divers, in accordance with another embodiment of the present disclosure.

FIG. 30 shows a diver application augmented see-through display view 4 of a HUD360 1 with a dive boat 162 on top of water surface 160, in front of land 32, floating on top of water 31 shown with diver 164 below and diver 166 obstructed by reef 62 with high points 168 augmented. Also shown in FIG. 30 is an indicator of something of interest 170 on the right side of the see-through augmented display view 4 along with a parameter display 156 at bottom of augmented see-through display view 4 with critical dive parameters to aid the diver in having a safer diving experience.

Figure 31:
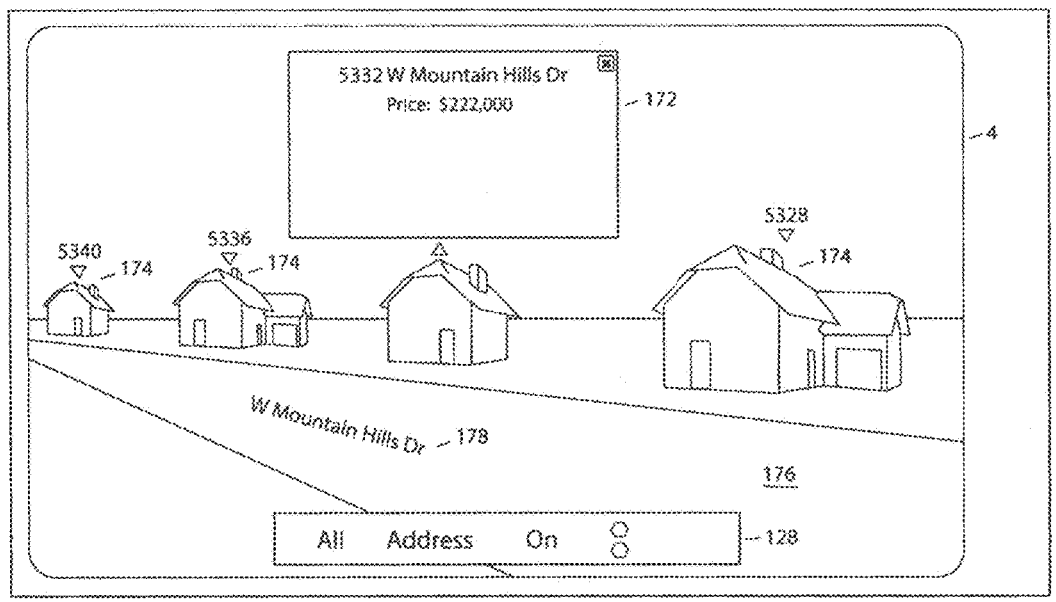
FIG. 31 is an illustration of a HUD360 application for emergency vehicle (such as fire and police), delivery personnel, or for a real estate agent travelling on a street, in accordance with another embodiment of the present disclosure.

FIG. 31 shows a HUD360 1 application see-through display view 4 for a real estate agent providing augmented display data on a selected house 172 showing any details desired, including a virtual tour, among other homes not selected 174 along street 176 with street label 178, and vehicle data display 128 augmented with real estate data on bottom of see-through display view 4 shown. Address labels are augmented on the see-through display view 4 above selected homes 174 using latitude and longitude data along with head-orientation data to align the address labels above the homes.

Figure 32:
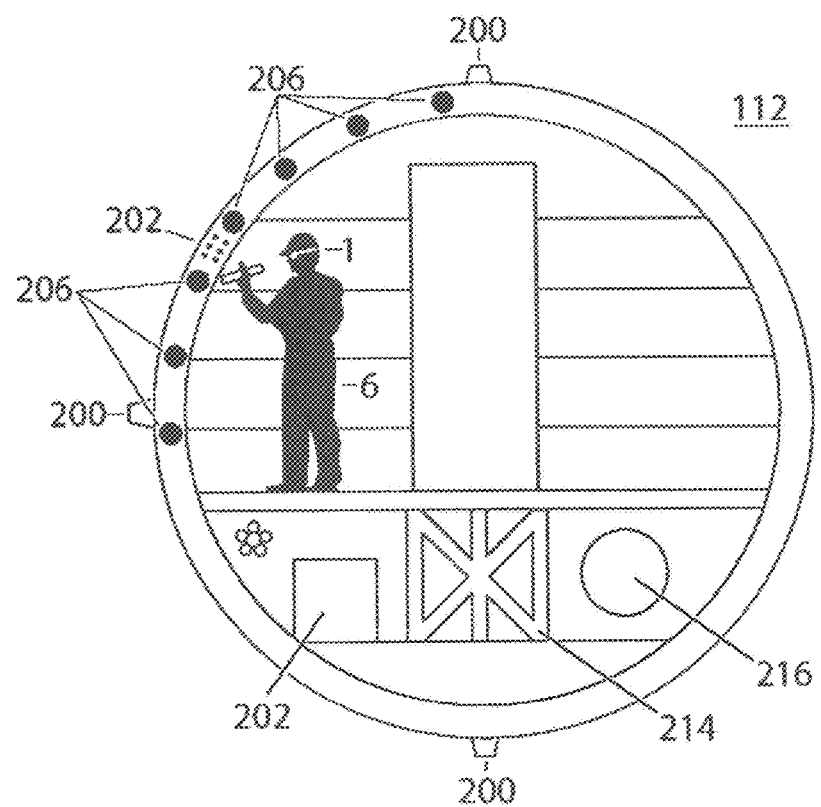
FIG. 32 is an illustration of a HUD360 application for manufacturing an airplane, in accordance with another embodiment of the present disclosure.

FIG. 32 shows a technician 6 installing a part inside an aircraft fuselage with space of interest 112 orientation sensor systems 200 are shown installed for temporary frame of reference during manufacturing where user 6 is shown with a wearable HUD360 1 where electrical lines 202 and hydraulic lines 206 are augmented to be visible to user 6. The position of the space of interest orientation sensor systems 200 can be pre-defined and are such that the frame of reference can be easily calibrated and communicate with the HUD360 1 device so that the augmentations are correctly aligned. The orientation sensor systems 200 provide the frame of reference to work with and report their relative position to the HUD360 1. The orientation sensors 200 can use wireless communications such as IEEE 802.11 to report relative distance of the HUD360 1 to the orientation sensors 200. Any type of sensor system 200 (such as wireless ranging, acoustic ranging, optical ranging, etc.) can be used to provide relative distance and orientation to the frame of reference, and the position and number of the points of reference are only significant in that a unique frame of reference is established so that the structure of geometry from the data are aligned with the indication from the orientation sensor systems 200. Other parts of the aircraft such as support beams 214, and ventilation tube 216 are all shown and can be augmented to user 6 even though they are blocked by the floor.

Figure 33:
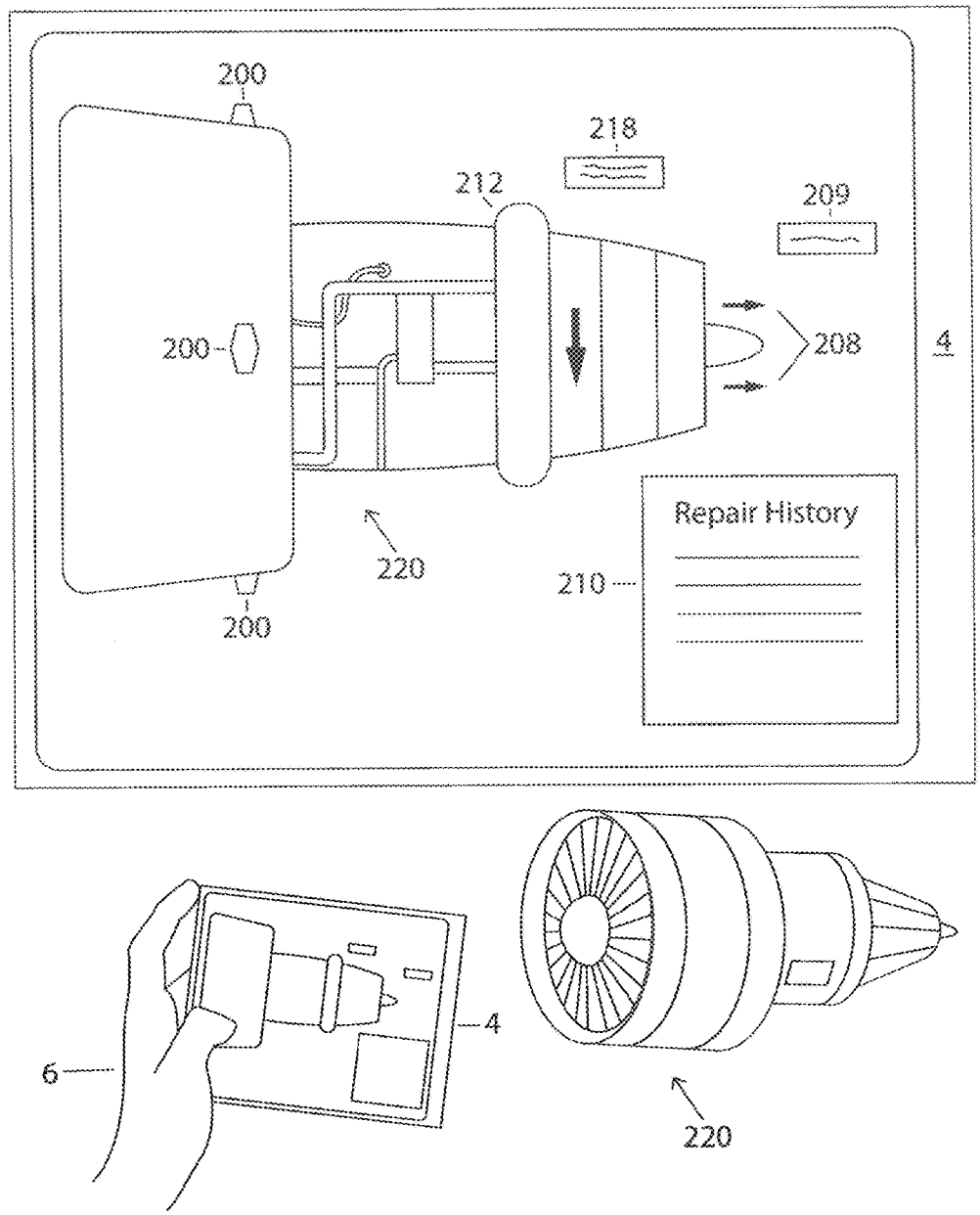
FIG. 33 is an illustration of a HUD360 application for repair of an airplane, in accordance with another embodiment of the present disclosure.

The top part of FIG. 33 shows the display 4 of a hand-held application with user 6 holding augmented display 4 on the bottom part of FIG. 33 shown in front of a disassembled aircraft engine with temporary orientation sensor systems 200 mounted for a frame of reference. Exhaust tubing 212 is augmented as highlighted with part number 218 augmented near the part. Flow vectors 208 and speed indication 209, along with repair history data 210 are also shown on the right side of the display. The user 6 can move the display to specific areas to identify occluded (invisible) layers underneath and to help identify parts, their history, function, and how they are installed or removed.

Figure 34:
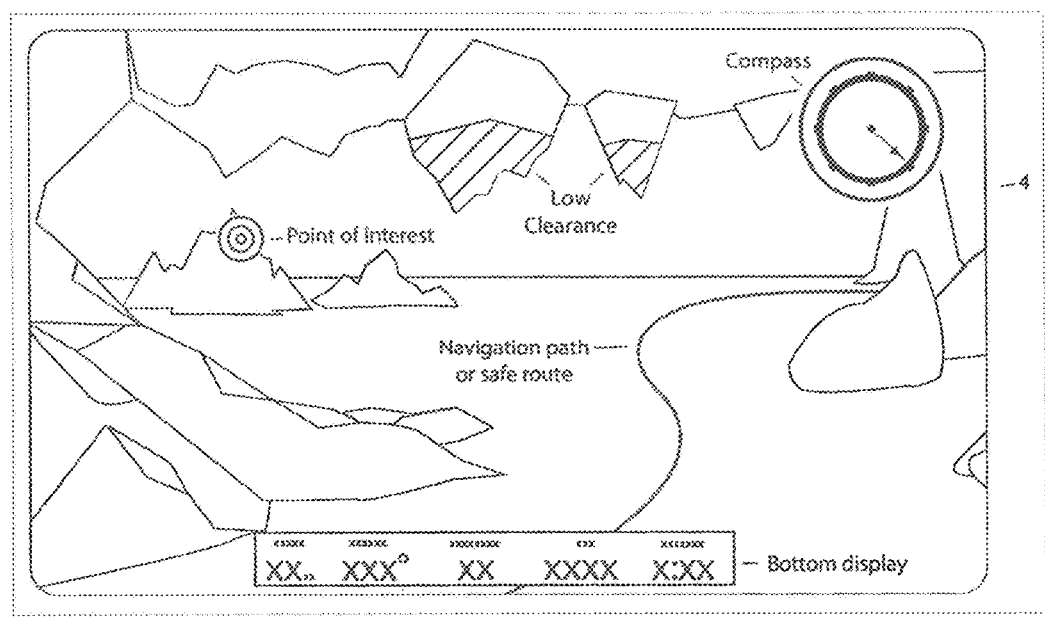
FIG. 34 is an illustration of a HUD360 application for spelunking, in accordance with another embodiment of the present disclosure.

FIG. 34 shows an augmented display 4 of a spelunking application using cave data, where augmentation is determined by inertial navigation using accelerometers, magnetic sensors, altimeter. Very Low Frequency (VLF) systems, or other techniques to retrieve position data to establish the alignment of the augmentation in a cave environment.

Figure 35:
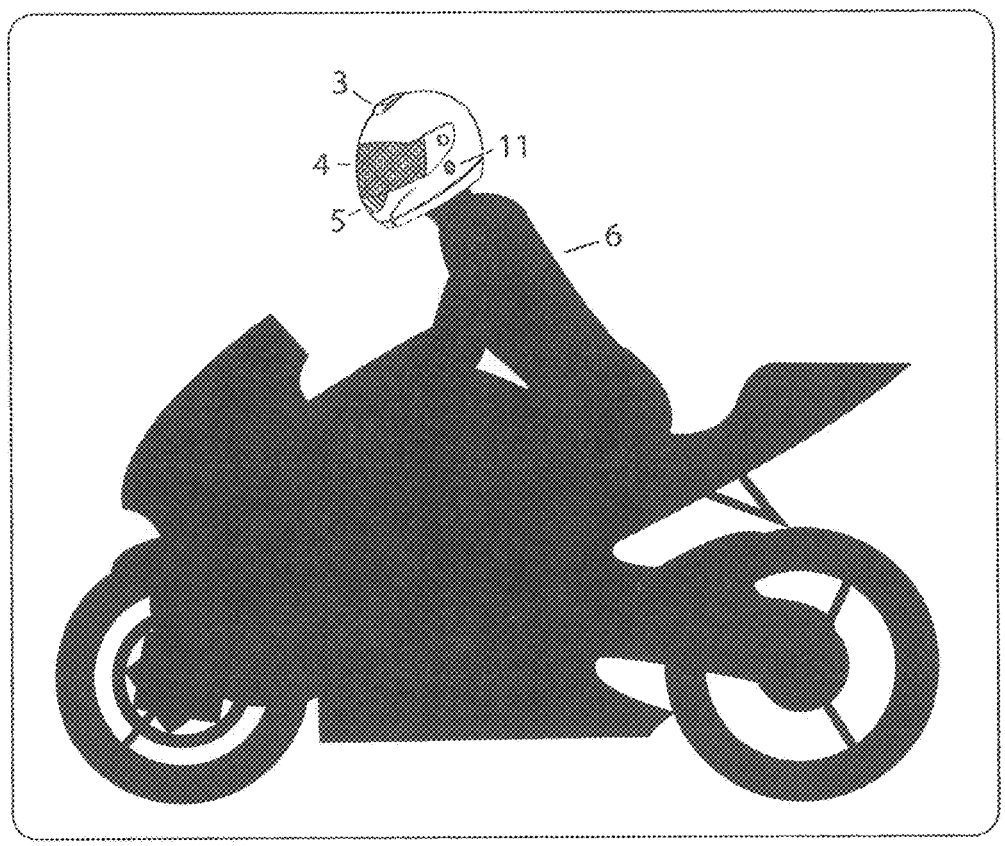
FIG. 35 is an illustration of a HUD360 application for a motorcycle, in accordance with another embodiment of the present disclosure.

FIG. 35 shows application of HUD360 1 by a motorcyclist user 6 where the helmet is part of the HUD360 1 system, or the HUD360 1 is worn inside the helmet by the user 6 where the display is controlled by voice command, eye tracking, or other input device.

Figure 36:
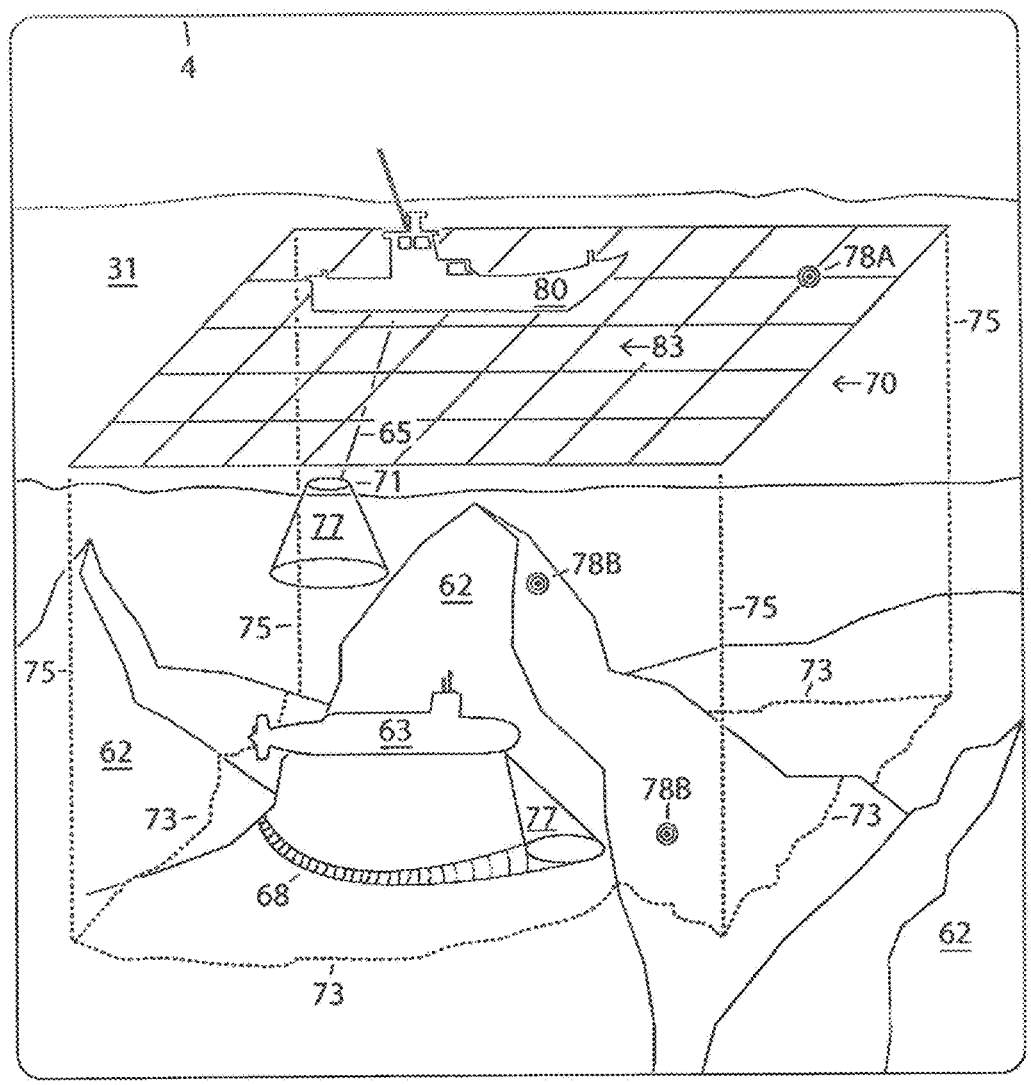
FIG. 36 is an illustration of a HUD360 application optimizing a recover search operation of an ocean floor with mountainous regions comparing sensor data with known surface data, in accordance with another embodiment of the present disclosure.

FIG. 36 shows an augmented display 4 of an underwater search area as viewed by a search team commander (such as from vantage point of an aircraft) with water 31 surface search grid 70 with surface current 83 and search vessel 80 dragging sensor 71 by drag line 65 with sensor cone 77. Search grid 70 corner debt lines 75 are shown from the corners of search grid 70 going beneath surface of water 31 along with search edge lines 73 projected onto bottom surfaces 62. Search submarine 63 with sensor cone 77 is shown near bottom surface 62 with already searched path 68 shown heading towards predicted probable positing of points of interest 78B based on dead reckoning from previous data or other technique from original point of interest 78A on surface of water 31. Techniques described for FIG. 24 apply for FIG. 36 as well, such as utilizing an initial dropped grid of surface flow beacons at each interval of search grid surface 70 to accurately identify surface drift on water 31 from time and initial spotting of debris as well as from first report of missing location, to pinpoint highest probability of finding objects of interest on bottom surface of water 62. The grid of surface beacons could be extended to measure depth currents as well, by providing a line of multiple spaced flow sensors down to bottom surface 62 providing data for improved three dimensional prediction of probable point of interests 78B on bottom surface 62.

Sonar data or data from other underwater remote sensing technology from surface reflections from sensor cones 70 of surface 62 can be used to compare with prior known data of surface 62 data where the sensor 71 data can be made so it is perfectly aligned with prior known data of surface 62, if available, whereby differences can be used to identify possible objects on top of surface 62 as the actual point of interest 788.

Figure 37:
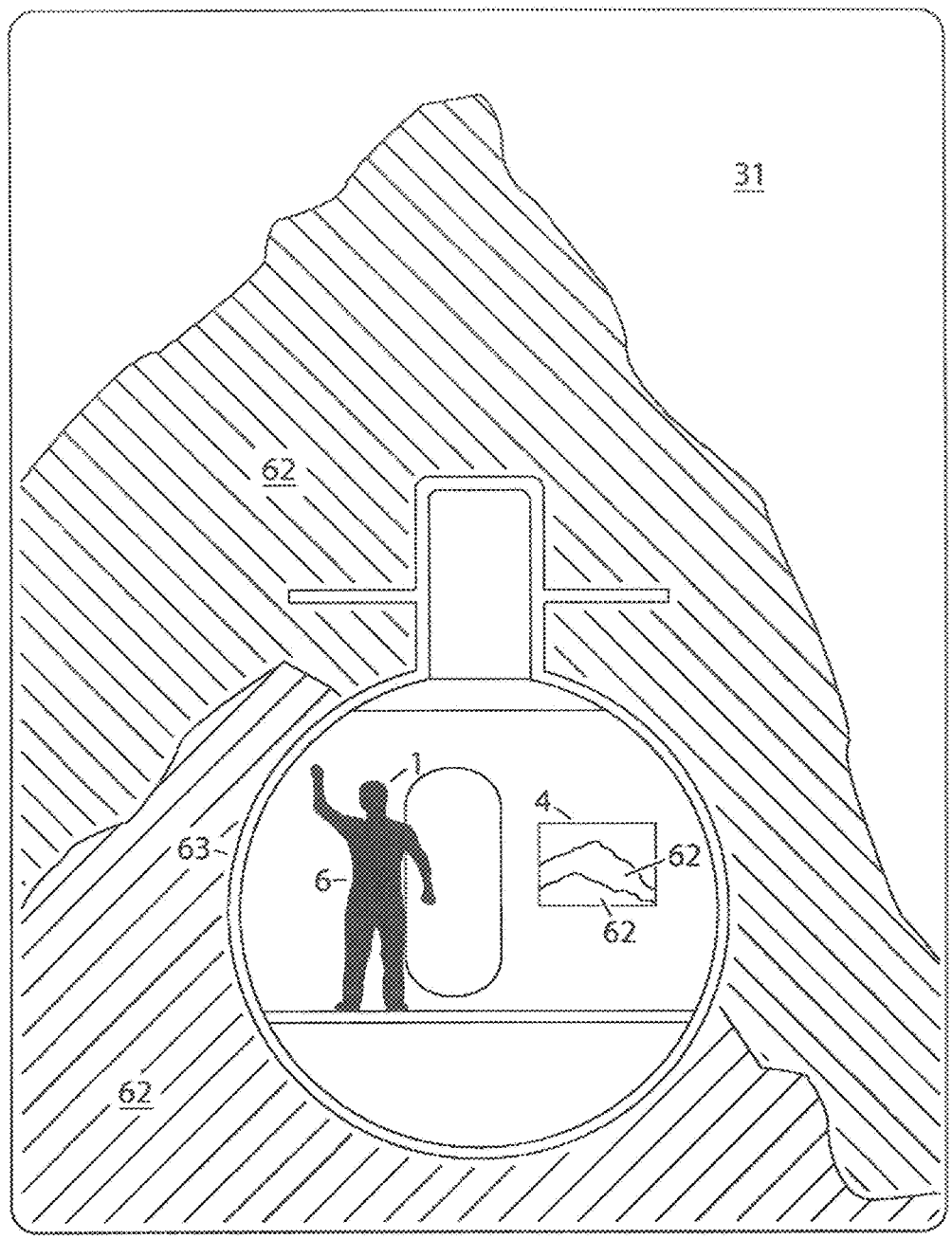
FIG. 37 is an illustration of a HUD360 application used by a submarine, in accordance with another embodiment of the present disclosure.

FIG. 37 shows a cross section of a submarine 63 underwater 31 near bottom surfaces 62. Display surface 4 is shown mounted where underwater mountain surfaces 62 are shown inside display surface 4 that correspond to bottom surfaces 62 shown outside submarine 32. Also shown is user 6 wearing HUD360 1 where orientation of augmentation matches the user's 6 head. Here the HUD360 1 and display 4 can serve as an aid to navigation for submarines.

All the figures herein show different display modes that are interchangeable for each application, and is meant to be just a partial example of how augmentation can be displayed. The applications are not limited to one display mode. For instance, FIG. 31 shows a ground view, but can also show a high level opaque mode view of the property a view high above ground looking down.

The present disclosure provides examples of a system, such as an ATC system, a pilot cockpit system, an automotive system, a military battlefield system, a medical system, or the like. The various systems may be useful, for example, for automatically receiving tactical and environmental data from multiple data points, (including terrain, weather, and other physical obstacles), processing and reconciling this data, and displaying data in a virtual three dimensional orthogonal space on a display device or wearable display device, as described above. The various examples above will enable a user to perform various functions, including:

a. Perfectly line up the projected image directly overlaying the real aircraft, terrain, and obstacle objects;
b. Select an object on the display and presenting known information about the object from an accompanying database;
c. View the moving objects current attributes, such as velocity, direction, altitude, vertical speed, projected path, etc.;
d. View the terrain and obstacle object's attributes, such as latitude, longitude, elevation, etc.;
e. View all moving aircraft flight plans, if the aircraft has a Flight Management flight plan and Automatic Dependent Surveillance Broadcast (ADS-B) or other comparable data link functionality;
f. Track each objects predicted position vector and flight plan, if available, to determine if a collision is anticipated, either in the air or on the ground taxiway, and provide a warning when an incursion is projected;
g. View the tactical situation from the point of view of a selected object allowing ATC to view the traffic from a pilot's point of view;
h. View ground traffic, such as taxiing aircraft;
i. Display ground obstacles in 3D from data in an obstacle database;
j. Update the 3 dimensional augmentations on the COTS light weight projection glasses based on movement of the user's head;
k. Allow selection and manipulation of 3 dimensional augmentations or other augmentation display data by combining eye tracking and head tracking with or without voice command and/or button activation;
l. Identify and augment real-time space type categorization;
m. View Joint STARS data;

n. Track each objects predicted position vector and identify battlefield conflicts and spaces;
o. View the tactical situation from the point of view of a selected object to allow the user to see a battlefield from any point of the battlefield;
p. See where friendly troops are to gain a tactical advantage on a battlefield;
q. Rotate the patient's image to view the patient from the inside;
r. Identify tumors, cancerous areas, etc before operating on the patient;
s. Allow the doctor to practice the procedure before operating on the patient;
t. Allow doctors to look at different ways to do an operation without putting the patient in peril;
u. Allow new doctors to practice and develop surgical skills without operating on a live patient;
v. Allow doctors to view the inside of the body in 3 dimensions using Arthroscopic camera technology;
w. Allow vision impaired people to read as well as watch television and movies;
x. Allow the user to use voice commands to select any options allowed by the system;
Y. Allow training by using a set of user definable objects in the controlled area; and
z. Allow the recording of the controlled area over a specified time period to allow later playback of all actions in the controlled area.

It should be emphasized that the above-described embodiments of the present device and process are merely possible examples of implementations and merely set forth for a clear understanding of the principles of the disclosure. Many different embodiments of the disclosure described herein may be designed and/or fabricated without departing from the spirit and scope of the disclosure. For example, this disclosure is not limited to users of aircraft and can just as easily be applied to automobiles or vessels/vehicles of any kind such as ships, spacecraft, and submarines. All these and other such modifications and variations are intended to be included herein within the scope of this disclosure and protected by the following claims. Therefore the scope of the disclosure is not intended to be limited except as indicated in the appended claims.

What is claimed is:

1. A system for displaying and updating data in three dimensions, comprising:
    a computer system connected to a communications network and configured to process data regarding multiple locations and create a virtual three dimensional orthogonal space wherein the data is associated with multiple locations in the virtual three dimensional orthogonal space;
    a wearable display device connected to the computer system;
    a head-tracking sensing sensor system connected to the wearable display device and to the computer system, configured to sense the movement and orientation of the wearable display device in real-time;
    an eye-tracking sensor system connected to the wearable display device and to the computer system, configured to sense the eye movement of a user wearing the wearable display device in real-time; wherein the computer system is configured to receive real-time data from the head-tracking sensing system and the eye-tracking sensor system and to process said real-time data to generate an image of the virtual three dimensional orthogonal space for display on the wearable display device; and
    a handheld control device that is configured to send a signal to the computer system, wherein the computer system is capable of displaying data related to any of the multiple locations;
    wherein the system is configured to track a first object's predicted position vector, display a possibly collision point between the first object and the user based upon the first object's predicted position vector, and predict the position the user must respond to in order to avoid collision with the object;
    wherein the system is configured to highlight a surface terrain visible through the wearable display device; and
    wherein the system displays out-of-sight indicators to alert the user regarding additional objects outside a view of the wearable display device.

2. The system of claim 1, further comprising a gimbaled zoom camera attached to the wearable display device.

3. The system of claim 1, further comprising a microphone, wherein the computer system is configured to recognize voice commands.

4. The system of claim 1, further comprising:
    wherein the computer system is configured to allow a user to select an object on the display and deliver known information about the object from an accompanying database;
    wherein the computer system is configured to display the attributes of an object in the virtual three dimensional orthogonal space;
    wherein the system is configured to display a plurality of moving aircraft flight plans; and
    wherein the system is configured to track each objects predicted position vector and flight plan, if available, to determine if a collision is anticipated, either in the air or on a ground taxiway, and provide a warning when an incursion is projected.

5. The system of claim 1, wherein the first object is an incoming aircraft.

6. The system of claim 1, wherein the system is further configured to track a predicted position vector for a second object.

7. The system of claim 1, wherein the computer system is configured to allow a user to select the first object on the display and deliver known information about the first object from an accompanying database.

8. The system of claim 1, wherein a known flight path of a first incoming aircraft and a predicted position vector of a second incoming aircraft are displayed to the user.

9. The system of claim 1, wherein the user can be displayed probable battle spaces to signify danger and probable safe spaces outside of the danger.

10. The system of claim 1, further comprising a military battlefield display system, wherein the military battlefield system is a first one of a plurality of military battlefield display systems which communicate and share information about a plurality of objects.

11. The system of claim 1, wherein the user can be displayed probable safe weather spaces.

12. The system of claim 1, wherein:
    the system is configured to display the virtual three dimensional orthogonal space from the point of view of a selected object;
    the system is configured to update the image of the virtual three dimensional orthogonal space based on movement of the user's head;

the system is configured to allow selection and manipulation of the image data by combining eye tracking and head tracking;
the system is configured to allow a vision impaired user to see; and
the computer system is configured to record the data of the virtual three dimensional orthogonal space over a specified time period.

\* \* \* \* \*